United States Patent [19]
Scharf et al.

[11] Patent Number: 5,896,480
[45] Date of Patent: Apr. 20, 1999

[54] OPTICAL INTERCONNECTION SYSTEM

[75] Inventors: Robert M. Scharf; Randal B. Lord, both of Melbourne, Fla.; Derek Imschweiler, Dallastown, Pa.

[73] Assignee: Stewart Connector Systems, Inc., Glen Rock, Pa.

[21] Appl. No.: 08/955,762

[22] Filed: Oct. 22, 1997

Related U.S. Application Data

[XX .
[60] Provisional application No. 60/029,578, Oct. 22, 1996, and provisional application No. 60/059,525, Sep. 22, 1997.
[51] Int. Cl.[6] .................... G02B 6/00; G02B 6/36
[52] U.S. Cl. .................................................. 385/88
[58] Field of Search ....................... 385/88–92, 147

[56] References Cited

U.S. PATENT DOCUMENTS

| | | | |
|---|---|---|---|
| 3,792,208 | 2/1974 | Meyer | 200/51 R |
| 4,744,626 | 5/1988 | Mery | 350/96.2 |
| 5,113,467 | 5/1992 | Peterson et al. | 385/88 |
| 5,283,680 | 2/1994 | Okugawa et al. | 359/171 |
| 5,347,604 | 9/1994 | Go et al. | 385/92 |
| 5,561,727 | 10/1996 | Akita et al. | 385/88 |
| 5,602,863 | 2/1997 | Itagaki | 372/50 |
| 5,604,831 | 2/1997 | Dittman et al. | 385/88 |
| 5,636,047 | 6/1997 | Lagoutte et al. | 359/163 |

*Primary Examiner*—Akm E. Ullah
*Attorney, Agent, or Firm*—Steinberg & Raskin, P.C.

[57] ABSTRACT

An opto-electric jack is provided which can be used as a drop-in replacement for a standard electrical jack such as an RJ-type or D-subminiature type jack. The opto-electric jack includes housing having a receptacle for receiving an optical plug which is coupled to a fiber optic cable, and a plurality of electrical terminals for connection to an electrical circuit. Preferably, the terminals are arranged in a predetermined array which corresponds to the terminal array (or footprint) of a standard electrical jack. An opto-electric conversion circuit is disposed within the housing, and is operable to convert optical signals received from the optical plug into electrical signals for transmission to the electrical circuit via the terminals, and to convert electrical signals received from the electrical circuit via the terminals into optical signals which are transmitted to the optical plug. The opto-electric conversion circuit preferably includes a light emitting diode or diode laser for converting electrical signals to optical signals for transmission along the fiber optic cable, as well as a photo diode or photo transistor for receiving optical signals sent along the optical cable and converting the same to electrical impulses for transmission to the electrical circuit.

46 Claims, 19 Drawing Sheets

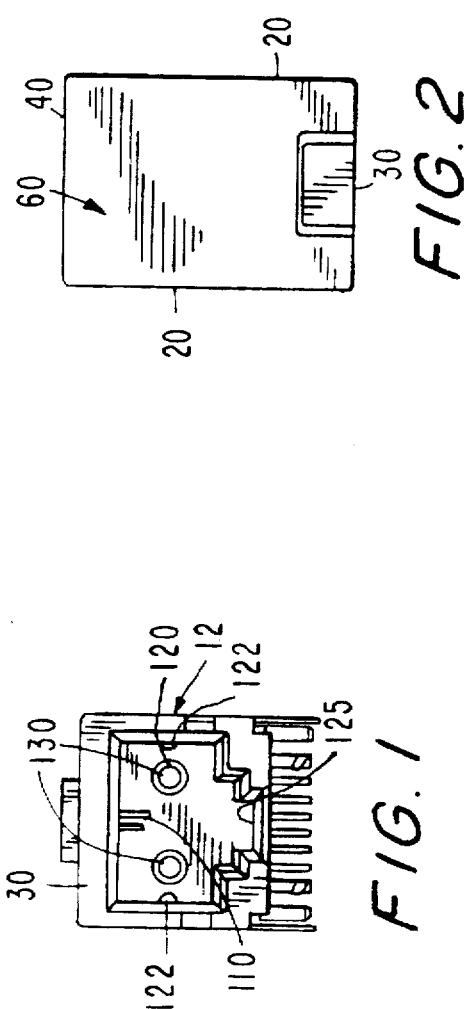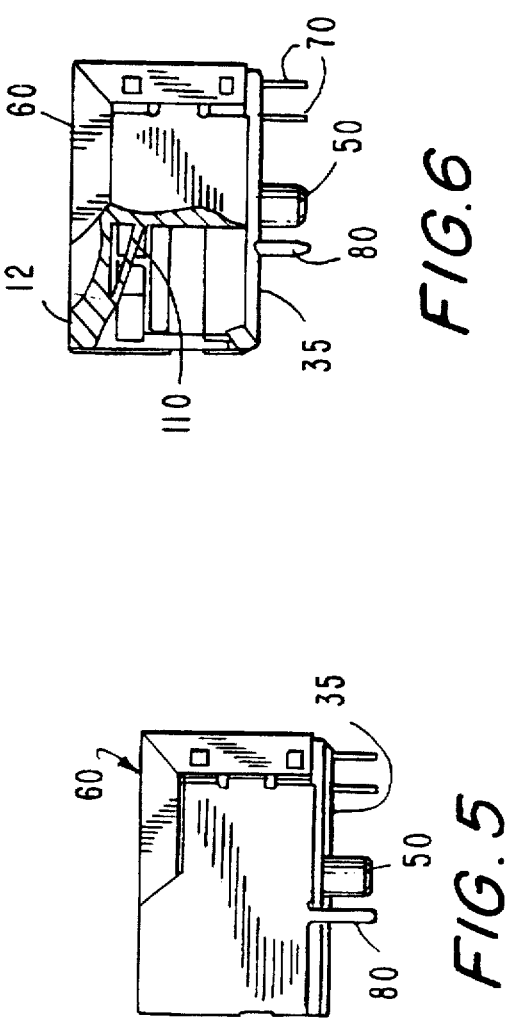

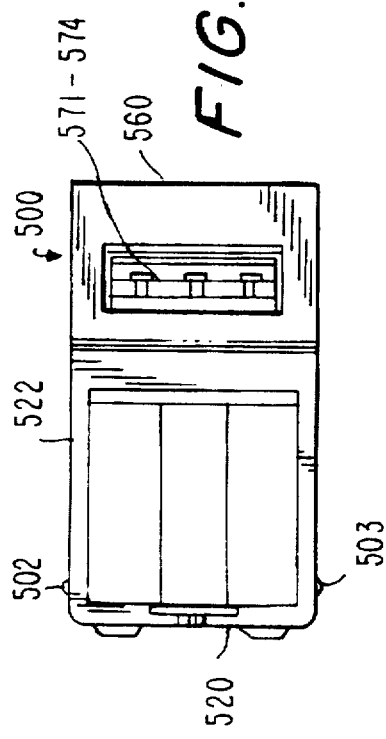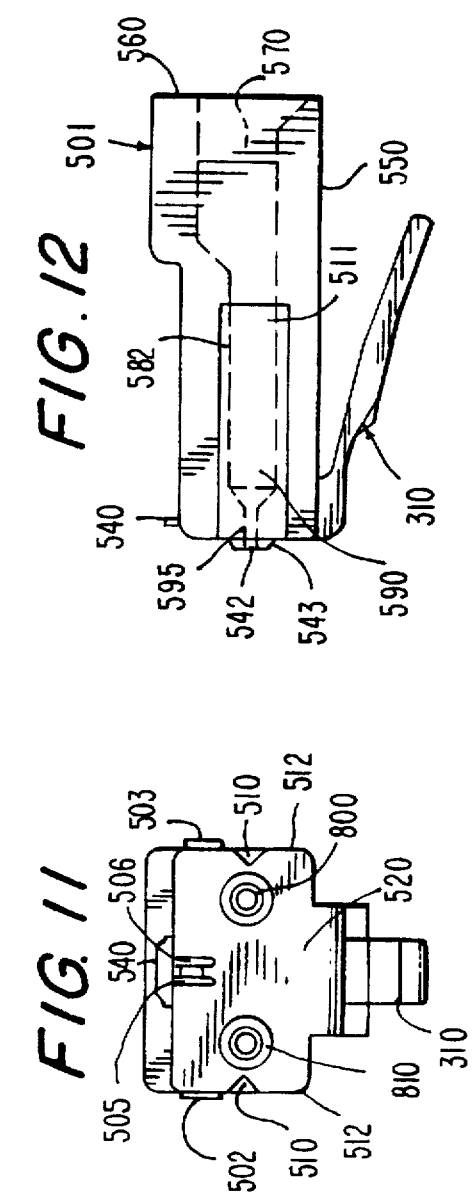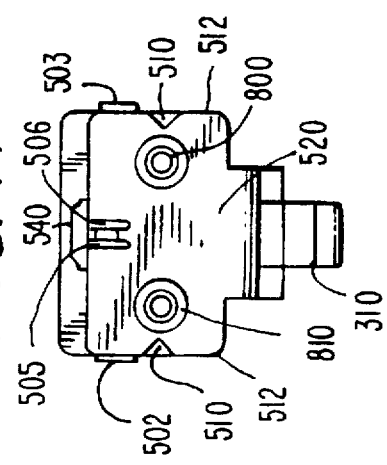

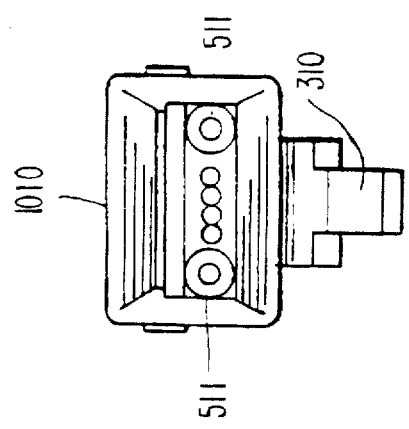
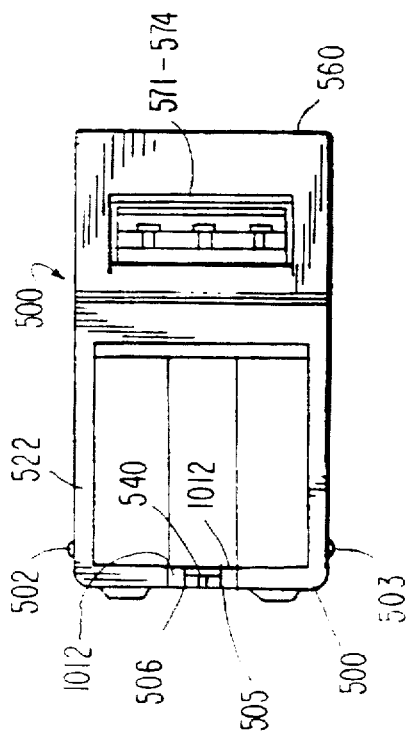
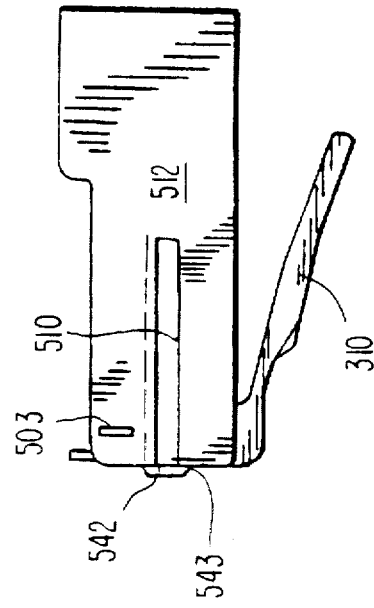
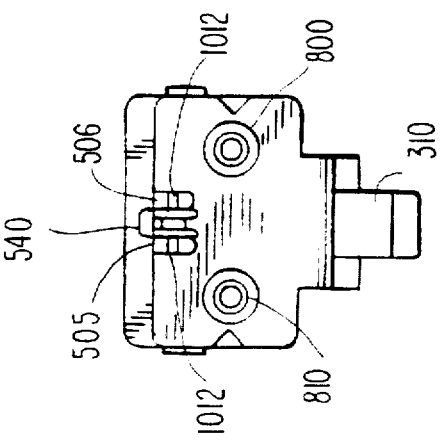

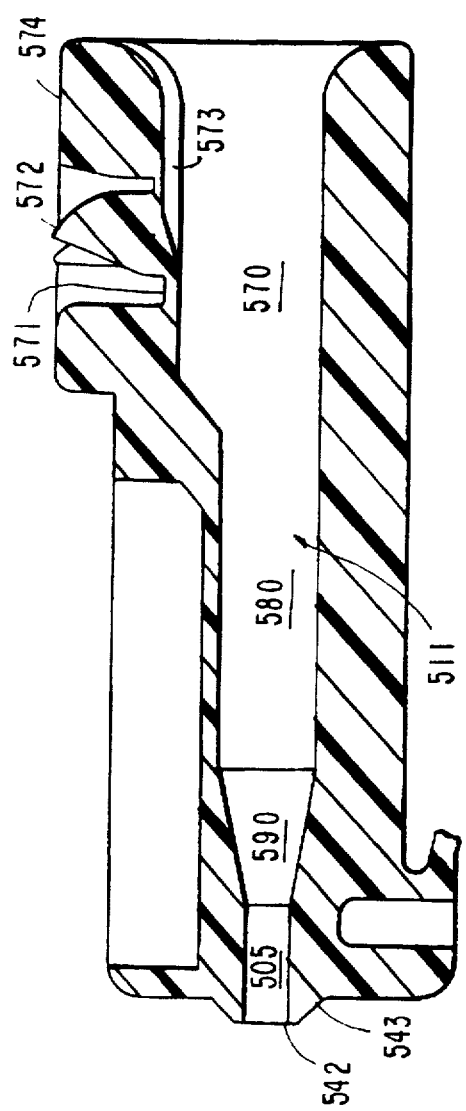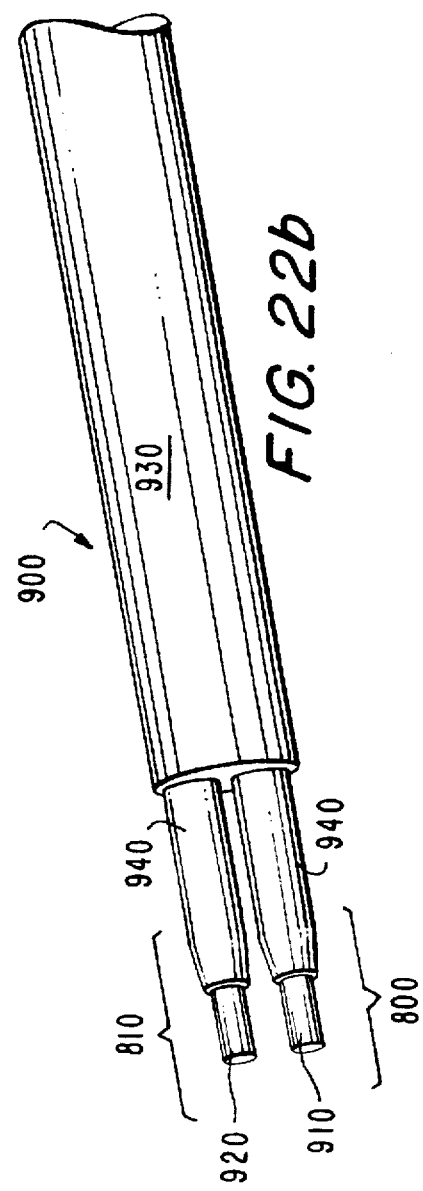

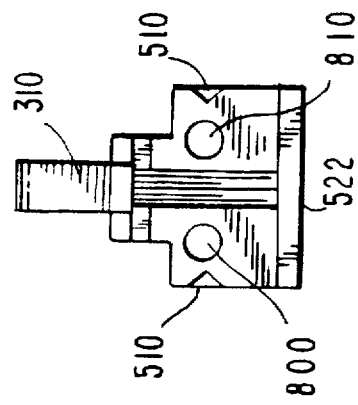
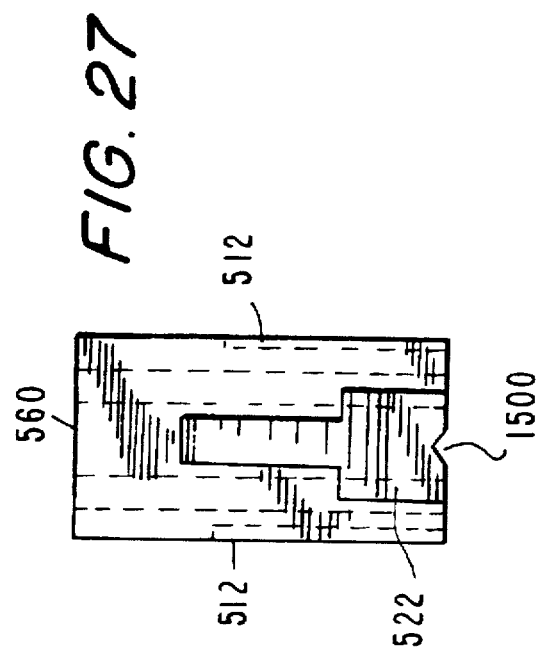
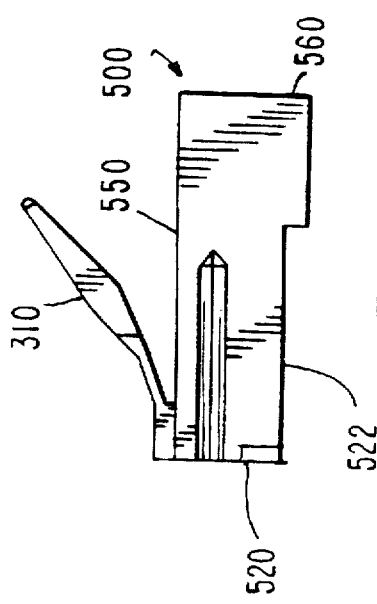

OPTICAL INTERCONNECTION SYSTEM

RELATED APPLICATIONS

This is a continuation-in-part of U.S. Provisional Patent Application Serial No. 60/029,578, filed on Oct. 22, 1996, and a continuation-in-part of U.S. Provisional Application Serial No. 60/059,525, entitled OPTICAL INTERCONNECTION SYSTEM, filed on Sep. 22, 1997 [and identified by Attorney Docket No. INSILCO 3.8-001 II], the specifications of which are hereby incorporated by reference.

FIELD OF THE INVENTION

The present invention relates to the field of fiber optic connectors.

BACKGROUND OF THE INVENTION

Connections to electronic data communication equipment such as circuit boards in computers, network interfaces, routers and the like, are conventionally made using electrical connectors. In this regard, it has become common practice to utilize standard RJ-type telephone plugs and jacks, and standard telephone wiring, to interconnect data communications equipment. It has become similarly common to use other standard types of electrical connectors in data communications applications, such as 9-pin, 15-pin or 25-pin D-subminiature connectors. Consequently, manufacturers of data processing equipment have designed the circuit boards and physical layout of their products to accommodate these types of connectors.

Developments in data communications, however, have made it desirable to replace the electrical cabling with fiber optic cabling, so that signals can be sent between pieces of equipment as light on the fiber optic cabling, rather than as electrical signals on electrical conductors.

SUMMARY OF THE INVENTION

It is therefore desirable to provide an adapter or optical jack which can be incorporated in a circuit board as a direct, drop-in replacement for a standard electrical jack, using the mounting holes on a printed circuit board which are normally occupied by the electrical jack, and which permits connection of the optical jack to a fiber optic cable.

In accordance with an embodiment of the present invention, an opto-electric jack is provided which can be used as a replacement for a standard electrical jack. The opto-electric jack includes housing having a receptacle for receiving an optical plug which is coupled to a fiber optic cable, and a plurality of electrical terminals for connection to an electrical circuit. Preferably, the terminals are arranged in a predetermined array which corresponds to the terminal array (or footprint) of a standard electrical jack. An opto-electric conversion circuit is disposed within the housing, and is operable to convert optical signals received from the optical plug into electrical signals for transmission to the electrical circuit via the terminals, and to convert electrical signals received from the electrical circuit via the terminals into optical signals which are transmitted to the optical plug. The opto-electric conversion circuit preferably includes a light emitting diode or diode laser for converting electrical signals to optical signals for transmission along the fiber optic cable, as well as a photo diode or photo transistor for receiving optical signals sent along the optical cable and converting the same to electrical impulses for transmission to the electrical circuit.

In accordance with a further embodiment of the present invention, the opto-electric jack is configured to provide a drop-in replacement for RJ-type modular jacks. RJ type jacks are produced in great numbers and are widely used in telephone and data communications applications. These jacks are economical and compact, and can be connected and disconnected readily by individuals with no special training. Moreover, since RJ type jacks are widely used as telephone jacks installed in homes and businesses, most individuals are already familiar with the manner in which these jacks are connected and disconnected. In accordance with this embodiment, the housing of the opto-electric jack is no greater than the outer dimensions of the smallest standard RJ-type jack which it is designed to replace. Preferably, the housing of the opto-electric jack has a generally rectangular shape which is substantially identical in its outer dimensions to the standard RJ-type jack which it provides a drop-in replacement for. In addition, the mounting provisions and electrical terminals of the opto-electric jack in accordance with this embodiment are arranged in a predetermined array which is identical to the terminal array and mounting provisions of a standard RJ-type jack. For example, if the opto-electric jack is configured to provide a drop-in replacement for a PCB (printed circuit board) mount RJ-type jack, it will include a pair of mounting posts, and an array of electrical terminals which is identical in position and size to the mounting posts and terminal array of a standard PCB mount RJ-type jack. Alternatively, if the opto-electric jack is configured to provide a drop-in replacement for a surface mount RJ-type jack, the electrical terminals will be configured as surface mount contacts, and will be in an array which is identical in position and size to the surface mount contacts of the standard surface mount RJ-type jack.

In accordance with a further aspect of this embodiment, an optical plug is provided which houses an end of a fiber optic cable, and which is generally similar in shape and mechanical function to the standard modular plug for an RJ-type jack. In this regard, the plug has a generally rectangular shape, and includes a resilient plug latch which is similar in shape and function to the plug latch on a standard RJ-type plug. In this manner, an optical plug and opto-electric jack are provided which are similar in size, shape, and mechanical function to the conventional RJ-type plug and jack which most individuals are already familiar with. This, in turn, allows the use of a fiber optic system without requiring individuals to become familiar with a new mechanical interconnection system.

In accordance with a further embodiment of the present invention, a mechanism is provided to disable the light emitting source in the opto-electric jack (e.g., an LED or diode laser) when the optical plug is removed from the opto-electric jack. This enhances the safety of the opto-electric jack by preventing the optical signal from impinging on the eyes of a person, and prolongs the life of the light emitting source.

In accordance with a still further embodiment of the present invention, electrical conductor wires are provided along with the fiber optic cables. Preferably, the electrical conductor wires and the fiber optic cables are housed in a single cable. This configuration is desirable when it is advantageous to directly connect electrical signals to a data communications device while, at the same time, connecting optical signals to data communication devices via optical/electrical conversion. For example, where fiber optic data communications devices are used as a substitute for a conventional telephone system, it is desirable to provide conventional electrical conductors as a backup. A conventional wired telephone system provides power to the telephone instrument via the telephone wires, and, consequently, a telephone instrument can receive and transmit messages even if utility power (e.g. on-site power for the instrument) is lost or otherwise unavailable. By providing electrical conductors along with the fiber optic cables, it is possible to use the electrical conductors to provide backup power capability and/or the ability to use a conventional telephone instrument in parallel with the fiber optic connections. Moreover, if local power is unavailable at the opto-electric jack, the electrical conductors can be used to power the opto-electric conversion circuitry and even the electrical circuit on the PCB.

In accordance with this embodiment, a plurality of conductor wires are provided along with the fiber optic cables. The optical plug includes a plurality of RJ-type plug contacts, each contact being coupled to a respective one of the conductor wires, and also includes at least one fiber optic cable. The opto-electric jack, in turn, includes a plurality of RJ-type jack contacts, which are positioned within the housing of the opto-electric jack so that they engage the respective RJ-type plug contacts, and thereby provide an electrical connection from each conductor wire to a corresponding RJ-type jack contact. The RJ-type jack contacts, in turn, can be coupled to the opto-electric circuit to provide power thereto, to the output terminals of the opto-electric jack to provide conventional electrical telephone service, and/or to otherwise provide an electrical connection to a component on the jack or on the PCB.

BRIEF DESCRIPTION OF THE DRAWINGS

FIG. 1 shows a front view of an embodiment of an opto-electric jack in accordance with the present invention.

FIG. 2 shows a top view of the opto-electric jack of FIG. 1.

FIG. 3 shows a bottom view of the opto-electric jack of FIG. 1.

FIG. 5 shows a side view of the opto-electric jack of FIG. 1.

FIG. 6 shows a partial cross-section through a side of the opto-electric jack of FIG. 1.

FIG. 8 shows a PCB layout for the opto-electric jack of FIG. 1.

FIG. 10 shows a top view of an optical plug in accordance with a first embodiment of the invention.

FIG. 11 shows a front view of the optical plug of FIG. 10.

FIG. 12 shows a side view of the optical plug of FIG. 10.

FIG. 13 shows a back view of the optical plug of FIG. 10.

FIG. 14 shows a top view of an optical plug in accordance with a second embodiment of the invention.

FIG. 15 shows a front view of the optical plug of FIG. 14.

FIG. 16 shows a side view of the optical plug of FIG. 14.

FIG. 17 shows a back view of the optical plug of FIG. 14.

FIG. 22(a) shows a cross-section through the plug of FIGS. 10, 14, and 18.

FIG. 22(b) shows a cable having a pair of optical cables disposed therein.

FIG. 25 shows a side view of the optical plug of FIG. 24.

FIG. 26 shows a front view of the optical plug of FIG. 24.

FIG. 27 shows a top view of the optical plug of FIG. 24.

DETAILED DESCRIPTION OF THE PREFERRED EMBODIMENTS

Figure 4:
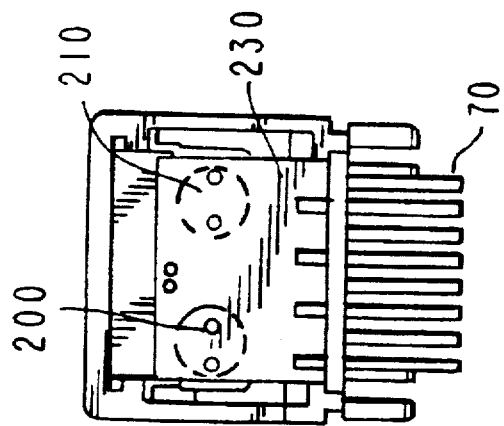
FIG. 4 shows a back view of the opto-electric jack of FIG. 1.

FIGS. 1–9 show an illustrative opto-electric jack 1 and optical plug 500 in accordance with the present invention. The opto-electric jack 1 is configured to provide a drop-in replacement for a standard RJ45 telephone jack. Referring to FIG. 1, the opto-electric jack 1 includes a housing 12 having a top side 10, a pair of lateral sides 20, a front face 30 having a receptacle 120 formed therein, a bottom side 35, and a back side 40. The housing 12 is formed from a dielectric material such as a polymer, preferably polycarbonate. In accordance with the preferred embodiment of the invention shown in FIGS. 1–9, the housing 12 has the same external dimensions as the housing used for a conventional RJ 45 telephone jack. The receptacle 120 has substantially the same configuration as the corresponding receptacle in a standard RJ 45 jack. Thus, it has a generally rectangular opening with an extension 125 at the bottom for engaging a latch 310 on an optical plug 300 as shown in FIG. 4. However, the housing 12 has a pair of ribs 122 extending in the front to back direction.

Figure 7:
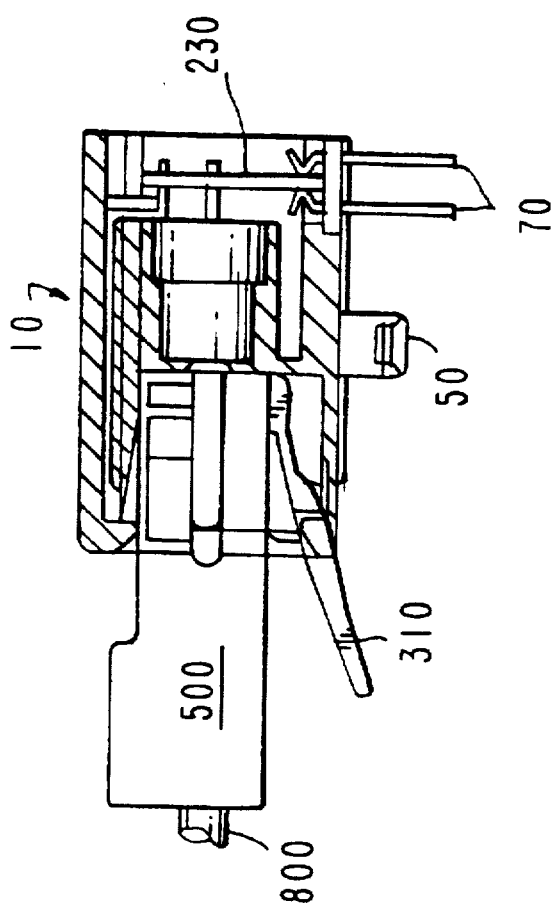
FIG. 7 shows a cross-section through a side of the opto-electric jack of FIG. 1, with an optical plug in accordance with an embodiment of the present invention inserted therein.
Figure 9:
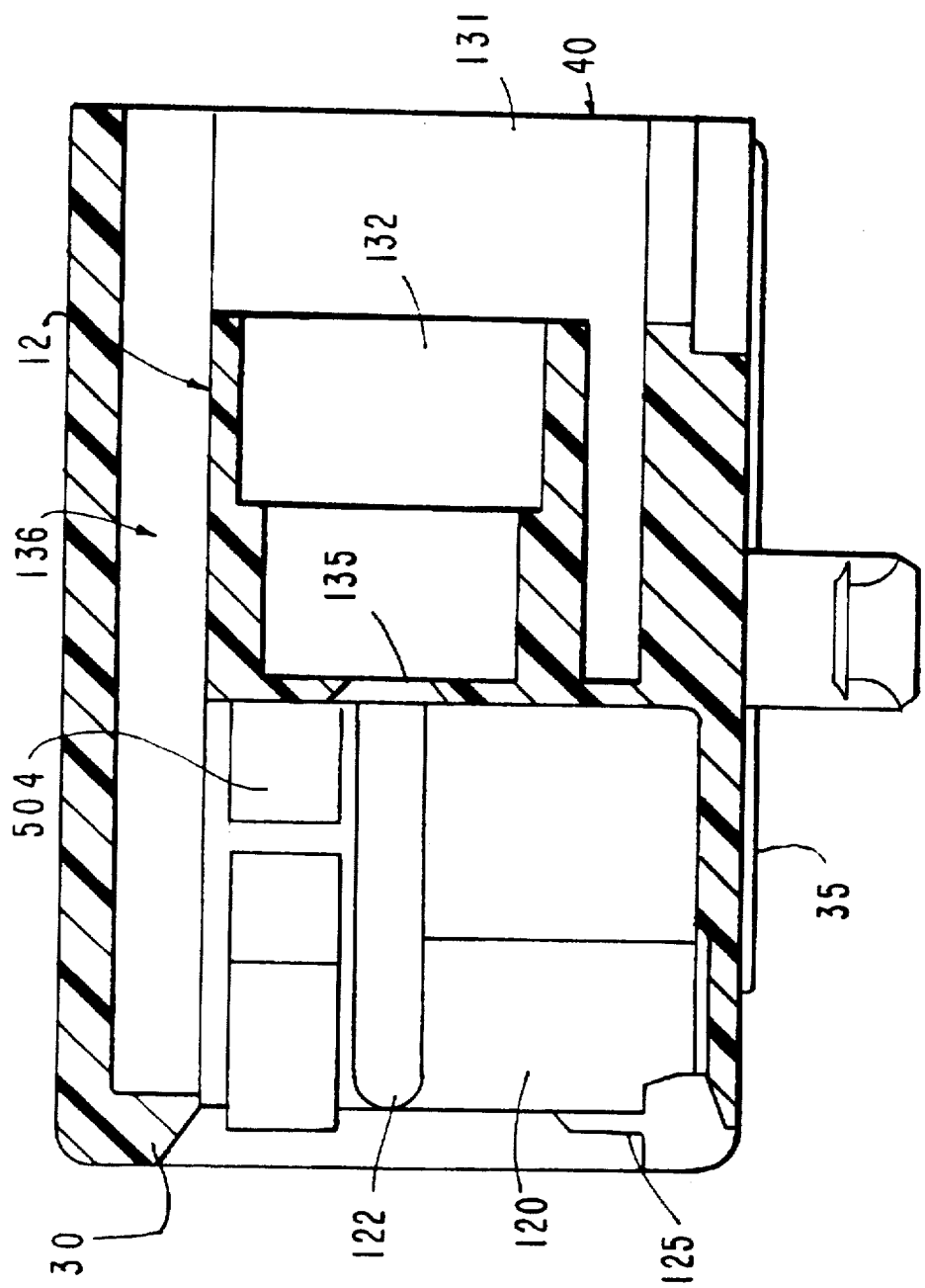
FIG. 9 shows a more detailed cross-section through a side of the opto-electric jack of FIG. 1.
Figure 21:
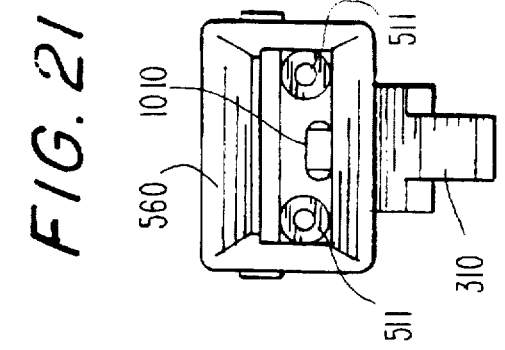
FIG. 21 shows a back view of the optical plug of FIG. 18.
Figure 18:
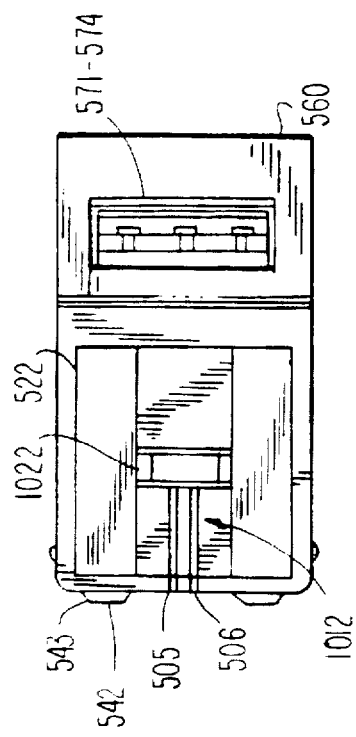
FIG. 18 shows a top view of an optical plug in accordance with a third embodiment of the invention.
Figure 20:
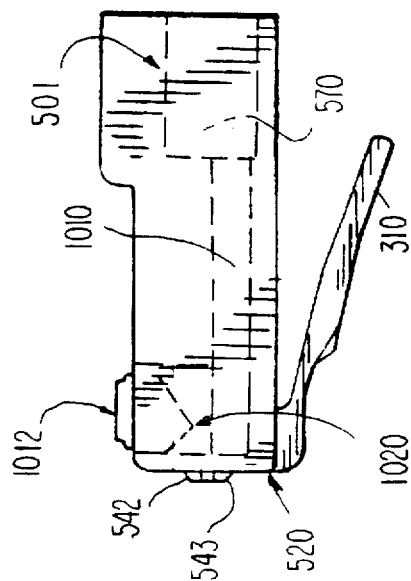
FIG. 20 shows a side view of the optical plug of FIG. 18.
Figure 19:
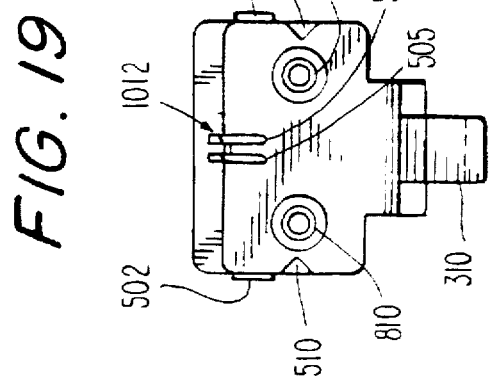
FIG. 19 shows a front view of the optical plug of FIG. 18.
Figure 23:
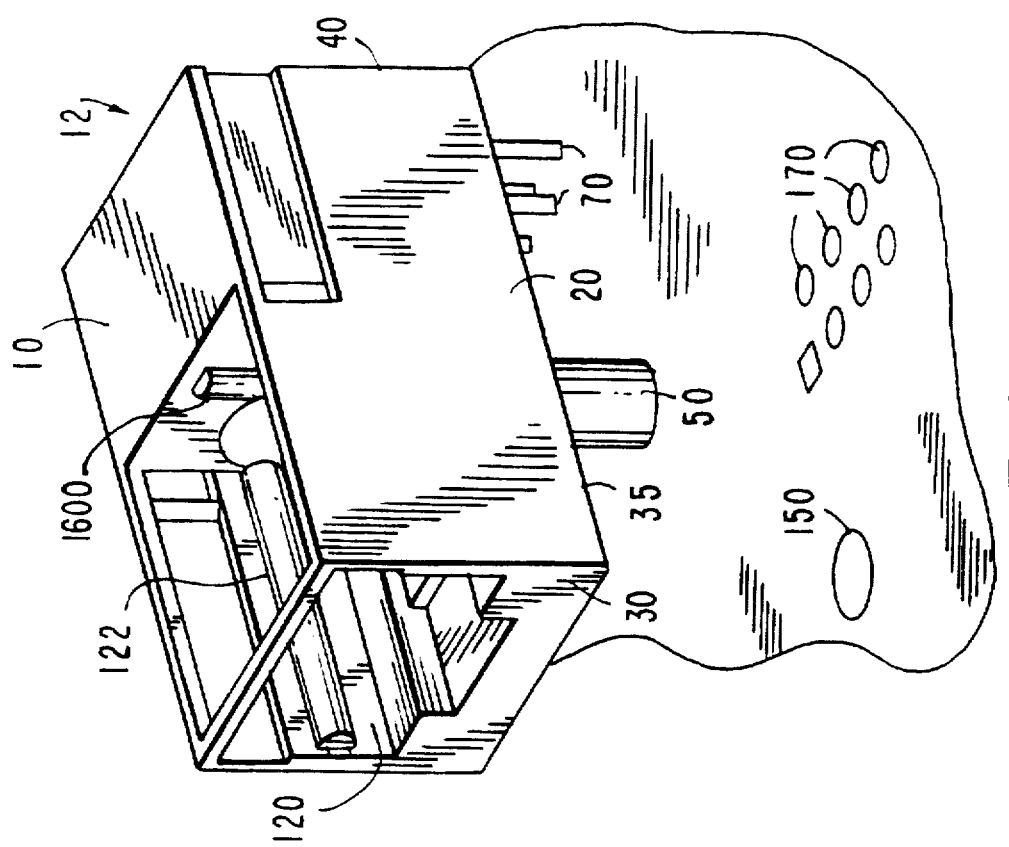
FIG. 23 shows an opto-electric jack in accordance with another embodiment of the invention.
Figure 24:
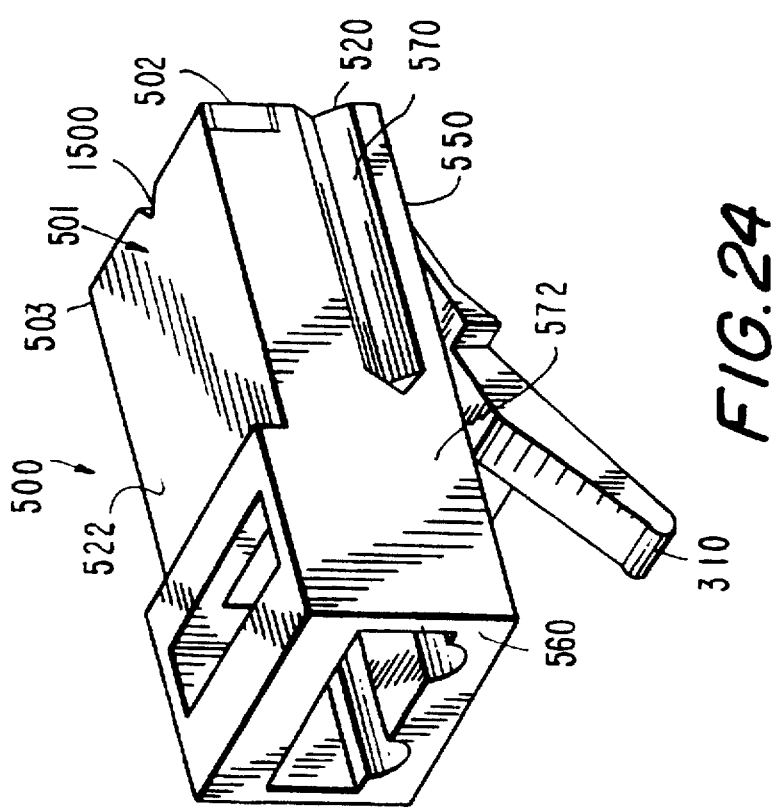
FIG. 24 shows a optical plug in accordance with another embodiment of the invention.
Figure 28:
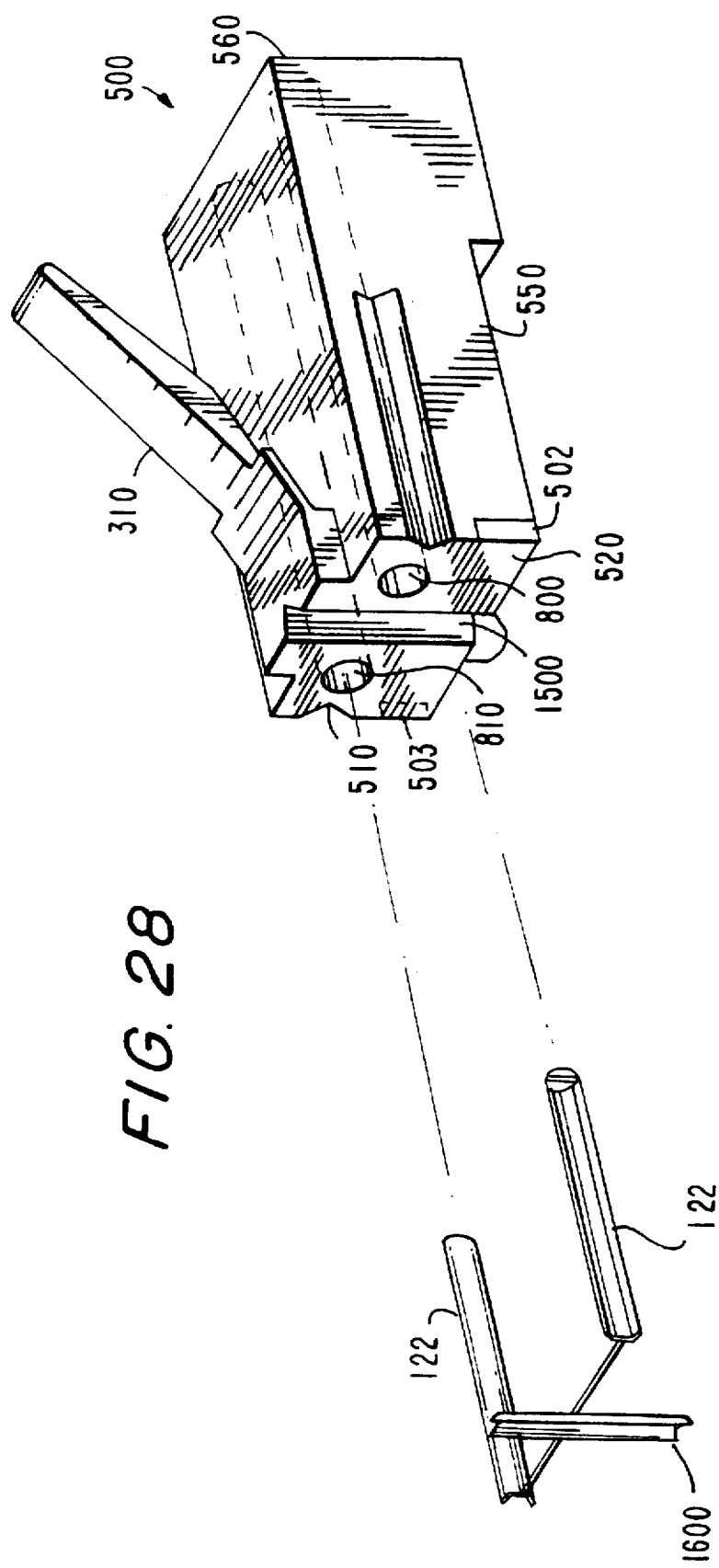
FIG. 28 shows an isometric view of the optical plug of FIG. 24.

Referring to FIGS. 4, 7, and 9, the housing 12 of the jack 1 has a pocket 131 formed in its back surface 40. A pair of bores 133 extend from an interior face 132 of the pocket through to the receptacle 120, so that there are a pair of openings 135 at predetermined locations in the receptacle 120. A circuit board 230 is disposed in the pocket 131 as shown in FIGS. 4 and 7. The circuit board 230 has an opto-electric conversion circuit mounted thereon. In the preferred embodiment shown in FIG. 4, the opto-electric conversion circuit includes a photo diode 200 for receiving optical signals and converting them to electrical signals, and a light emitting diode 210 ("LED") for receiving electrical signals and emitting optical pulses. The LED 210 is received in one bore 132, and the photo diode 200 is received in the other bore 132.

Referring to FIGS. 1, 3, 4, and 5, the opto-electric conversion circuit on the circuit board 230 is connected to an array of terminal pins 70 projecting downwardly from the bottom of the housing. The terminal pins 70 are disposed in an array which matches the PCB hole layout of FIG. 8. Since the opto-electric jack 1 is intended to provide a drop-in replacement for an RJ-45 type jack, the array of terminal pins 70 is identical to the terminal pin arrays used in standard telephone RJ connectors. In this regard, it is not essential that all of the pins be provided; some may be omitted or left unconnected to the circuit board. That is, only some positions of the array need to be utilized.

A pair of contacts 110 extend from the circuit board 230 in the pocket 131 through a channel 136 in the housing. The channel 136 is shown most clearly in FIG. 9.

As illustrated in FIG. 6, the mechanical configuration of the contacts 110 and the manner in which the contacts 110 are mounted in the housing is preferably identical to the corresponding features of the standard contacts used with standard RJ-45 jacks, although only two contacts are provided in this particular embodiment rather than the eight electrical contacts of the standard RJ-45 jack. In FIG. 1, the contacts 110 are spaced apart from one another by about 0.040 inches (1.02 mm) on center and are equidistant from the center line of the receptacle 120 so that they correspond to standard RJ-45 contact pair 1. As in a conventional RJ-45 jack, the contacts 110 include projecting fingers which extend downwardly and rearwardly from the face of the receptacle 120, with the free end of each contact 110 being disposed within a vertical channel to allow the contact 110 to flex upwardly within the receptacle 120 when the plug 300 is inserted into the receptacle 120. As discussed below, the contacts 110 are coupled to the circuit board 230, and make connections with a shorting element 540 on the plug 300.

Referring to FIGS. 1, 5, and 6, a metallic shield 60 may be disposed around the housing 10 to shield the jack 1 from interference from the electronic components on the PCB. The shield configuration can be the same as the shield used in shielded RJ-45 jacks for data communications. A pair of shield pins 80 project downwardly from the bottom surface of the housing, i.e., downwardly beneath the plane defined by the bottom surface. The shield pins are spaced apart from one another and spaced from the mounting connectors in the manner shown in FIG. 8 so that the spacing of the shield pins 80 corresponds exactly to the spacing of the shield pins commonly used for mounting and connecting an RJ 45 jack. The housing 10 also has a pair of circuit board mounting posts 50 which are arranged to make a snap fit into holes in the PCB. The circuit board mounting posts 50 are of the same configuration, and located in the same locations relative to the terminal pins 70 and shield pins 80, as the circuit board mounting posts on a standard RJ 45 connector. FIG. 8 illustrates the relative positions of a standard RJ-45 footprint.

FIGS. 10–13 show an optical plug 500 which is adapted for insertion into the opto-electric jack 1 of FIGS. 1–9. The plug 500 has a generally rectangular plug body 501 formed from a dielectric material such as a flexible polymer, preferably a polycarbonate molding compound. The plug body 510 has a front face 520, a back face 560, a top side 522, a bottom side 550, and a pair of lateral sides 512 having grooves 510 formed therein. A resilient latch 310 extends fro the bottom side 310 of the plug body 501. A pair of protrusions 502, 503 project slightly outwardly from the opposite side surfaces 512 adjacent the front 520 of the plug body 510. A pair of fiber optic cables 800, 810 extend through the plug 500, each terminating flush with a face 542 of a annular protrusion 543. When the plug 500 is inserted into the receptacle 120 of the jack 1, the ribs 122 of the jack 1 engage the respective grooves 510 of the plug 500. The interengagement of the grooves 510 and the ribs 122 provide a number of advantages, including, for example, maintaining the proper alignment of the plug 500 in the receptacle 120. In addition, the presence of the ribs 122 serves the additional purpose of blocking insertion of a standard RJ-type telephone plug, because RJ-type telephone plugs do not have the corresponding grooves. The provision of the protrusions 502, 503, which engage respective slots 504 in the receptacle 120 of the jack 1, along with the grooves 510, inhibit transverse movement of the plug 500 in the receptacle. Apart from the bumps and grooves, the external dimensions of the front part of the plug body 501 are generally similar to those of a standard RJ type plug. In this regard, the resilient latch 310 is also of the same general construction as the resilient latch on a standard RJ-type plug.

The plug body 501 also includes a pair of guide channels 505, 506 which are disposed at the intersection of the front 506 and top 522 surfaces. These guide channels 505, 506 are positioned to correspond to the positions of the contacts 110 in the jack. The plug body 501 includes a pair of fiber optic bores 511 which extend longitudinally forward from a pocket 570 formed in the back 560 of the plug 500 to an opening in the face 542 of the protrusion 543. As best seen in FIG. 22, each fiber optic bore 511 has a relatively larger diameter section 580, a tapered section 590, and a small diameter section 595 which opens onto the face 542 of the protrusion 543. The plug body 501 also includes integral strain relief elements 571–574 which are of the same general construction as the strain relief elements of a convention RJ-type plug.

A shorting element 540 in the form of a metal bar is mounted to the plug body 501 adjacent the front top edge. The shorting element 540 extends in the crosswise or lateral direction across the guide channels 505, 506 of the plug body. The shorting bar may be disposed at a lower height than that shown in FIGS. 11 and 12. In any case, when the plug 500 is inserted into the jack 1, the contacts 110 of the jack 1 are received in the guide channels 505, 506 (which as explained above and shown in FIGS. 10 and 11 open to both the top and front faces of the plug), and engage the shorting element 540, thereby creating an electrical connection between the contacts 110.

Figure 29:
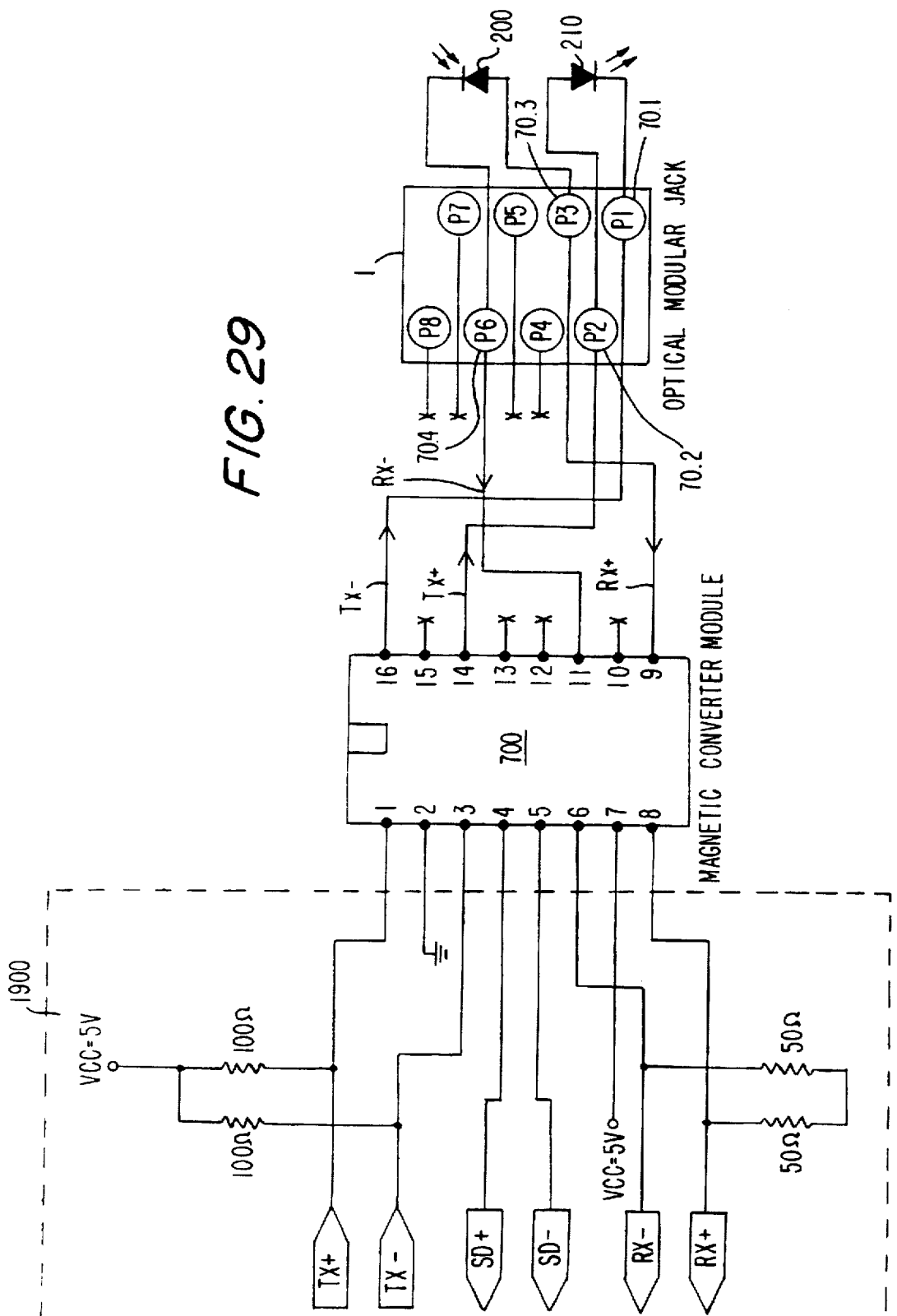
FIG. 29 shows a schematic of a opto-electric jack and a magnetic converter module.
Figure 30:
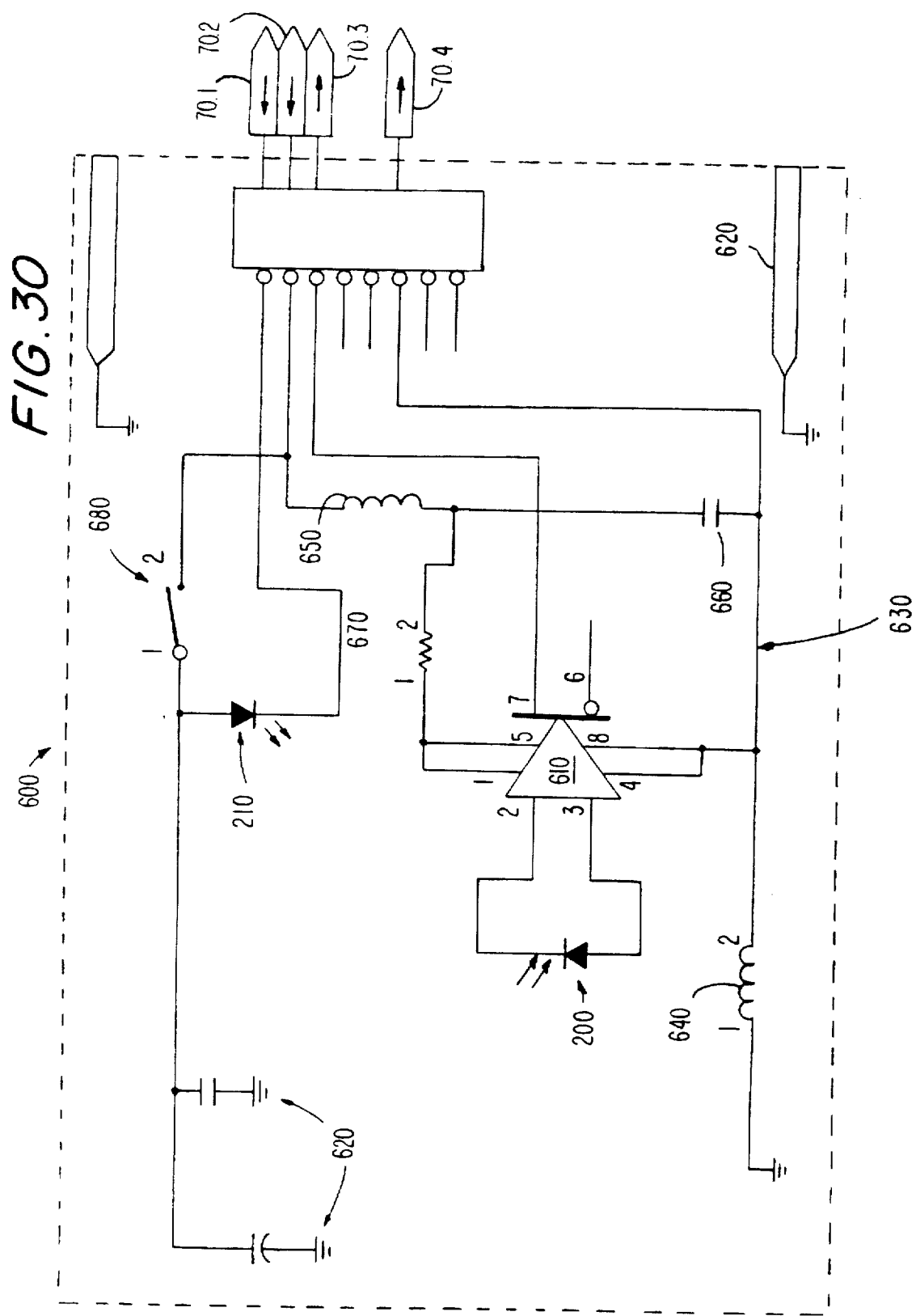
FIG. 30 shows a preferred embodiment of an opto-electric conversion circuit.

A preferred embodiment of the opto-electric conversion circuit which resides on the circuit board 230 of the jack 1 is shown in FIGS. 29 and 30. The opto-electric circuit 600 includes the aforementioned LED 210 and receiving photo diode 200. Two of terminal pins 70 (designated "TX−" 70.1 and "TX+" 70.2) are connected across the LED 210. Terminal pin 70.2 (TX+) is connected to one of the contacts 110, and the input to the LED 210 is connected to the other contact 110. When there is no plug 300 in the receptacle 120, the contacts 110 are not connected to one another, thereby creating an open circuit (illustrated in FIG. 30 by the open symbolic switch 680 between nodes 1 and 2) which disables the LED 210. The receiving photo diode 200 is connected to the signal inputs (leads 2 and 3) of an amplifier 610. The signal output (lead 7) of the amplifier 610 is connected to another one of the terminal pins 70.3 (designated "RX +"). The ground connections (leads 4,8) of the amplifier 610 are connected to a local or analog ground 630. The analog ground 630 is connected to another one of the terminal pins 70.4 (designated RX–), and to a principle ground 620 via an inductor 640. The power input connections to the amplifier 610 (leads 1 and 5) are connected through a resistor 670 to a node 690, which in turn, is connected through an isolating inductor 650 to terminal pin 70.2 ("TX+"). The node 690 is also connected through a capacitor 660 to the local ground 630. The inductor 650 and capacitor 660 serve to isolate the power input connections (leads 1, 5) from signals and transients on TX+. The local ground 630 is connected through an inductor 640 to a principal ground potential 620. In this embodiment, the principal ground potential 620 is the shield 60. Stated another way, the principal ground potential is the case ground potential. The local ground 630 is effectively isolated from transients applied at the principal ground 620 by an inductor 640.

Figure 31:
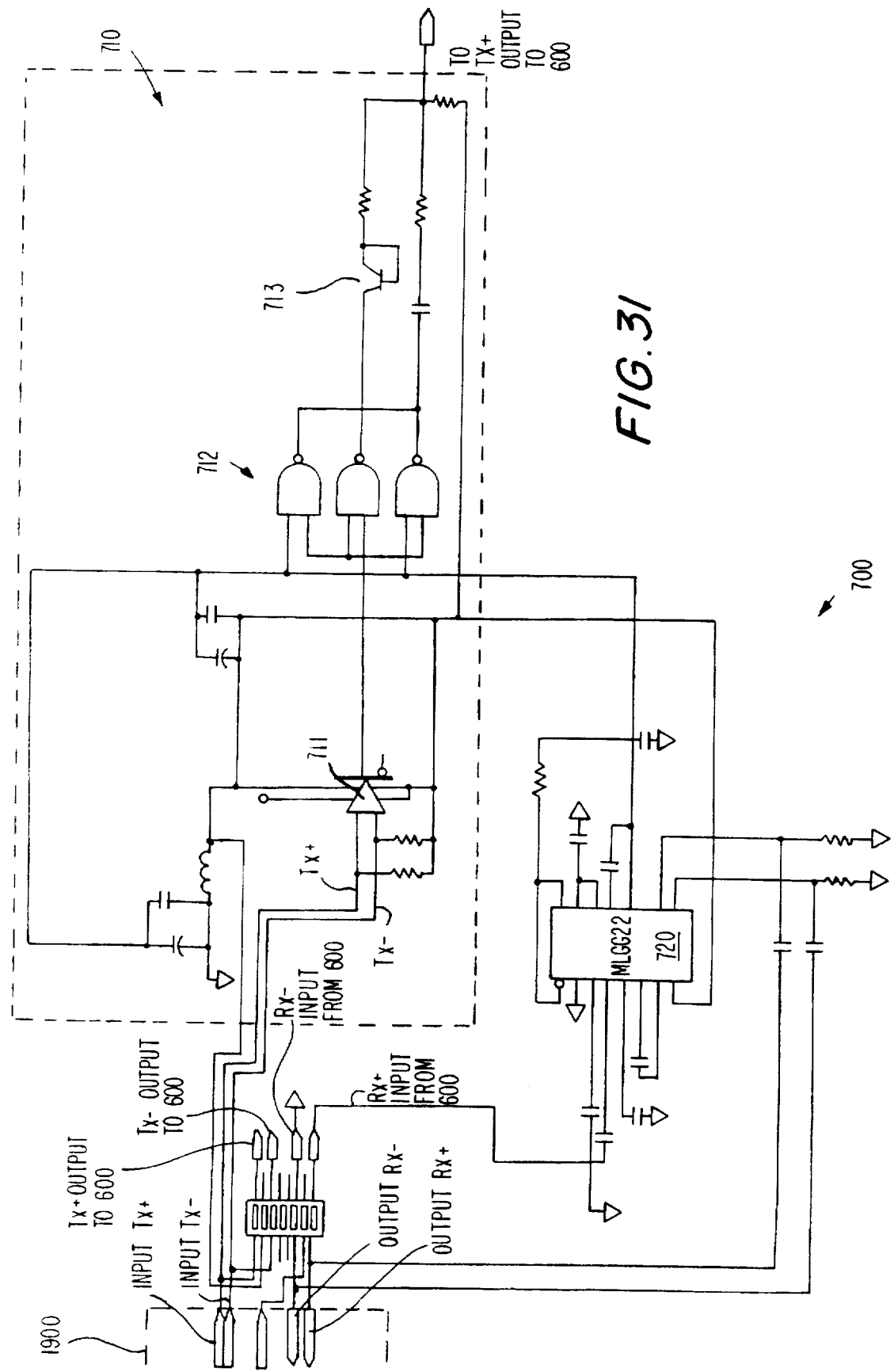
FIG. 31 shows an illustrative embodiment of the magnetic converter module.

A driver circuit 700 for driving the opto-electric conversion circuit 600 of FIG. 30 is shown in FIGS. 29 and 31. Preferably, the driver circuit 700 is incorporated into a standard 16- dip mounting, and can be installed in the circuit board position commonly used for isolating circuits, such as magnetic circuits with electrical Ethernet connections. Thus, the driver circuit of FIG. 6 is also referred to as a "magnetic converter." In general, the driver circuit includes a fiber optic LED driver 710 which drives the LED 210 and a data quantizer 720 which acts as a receiver for the photo diode 200. The driver 710 and quantizer 720 may be of any known construction. An example of an acceptable quantizer 720 is the ML6622 High Speed Data Quantizer manufactured by Micro Liner, and an example of an acceptable driver 710 is the ML6632 High Speed Fiber Optic LED Driver manufactured by Micro Linear. The driver 710 can also be implemented using a discrete amplifier 711, NAND gates 712 and transistor 713 as shown in FIG. 31.

In use, the opto-electric jack 1 is mounted to a circuit board of a data communications device such as an Internet or other interface card used in a personal computer, router, peripheral device or the like. The jack 1 is mounted in a mounting of the type normally used for an RJ type jack. The terminal pins 70 are received in corresponding holes in the circuit board and electrically connected to traces on the circuit board, for example, by conventional soldering techniques. The jack 1 is physically retained on the circuit board by the posts 50 on the housing, which are also engaged in corresponding holes in the circuit board. A driver circuit 700 as shown in FIGS. 29 and 31, or another appropriate driver circuit is connected through traces on the circuit board to the appropriate terminal pins 70 of the jack. Preferably, the footprint of the driver circuit 700 corresponds to the footprint of the conventional magnetics chip which it is designed to replace so that the opto-electric jack 1 and driver circuit 700 can be used as a drop-in replacement for a conventional RJ-type jack and magnetics chip without requiring the traces in the PCB to be altered.

FIGS. 23 through 28 show an opto-electric jack 1 and plug 500 in accordance with another embodiment of the present invention, with similar components bearing the same reference numerals as FIGS. 1–22. The plug 500 is similar to the plug of FIGS. 10–14 and has a generally rectangular plug body 501, formed from a dielectric material such as a flexible polymer, preferably a polycarbonate molding compound. The plug body 510 has a front face 520, a back face 560, a top side 522, a bottom side 550, and a pair of lateral sides 512 having grooves 510 formed therein. A resilient latch 310 extends from the bottom side 310 of the plug body 501. A pair of protrusions 502, 503 project slightly outwardly from the opposite side surfaces 512 adjacent the front 520 of the plug body 510. However, the front face 520 has a generally planar surface with a vertically extending notch 1500 formed therein, and the fiber optic cables 800, 810 terminate flush with the planar surface of the front face 520. The opto-electric jack 1 is similar to the jack of FIGS. 1–9, and includes a housing 12 having a top side 10, a pair of lateral sides 20, a front face 30 having a receptacle 120 formed therein, a bottom side 35, and a back side 40. Like the jack of FIGS. 1–9, the receptacle 120 has substantially the same configuration as the corresponding receptacle in a standard RJ 45 jack, has a generally rectangular opening with an extension 125 at the bottom for engaging a latch 310 on the optical plug 300, and has a pair of ribs 122 extending in the front to back direction. However, the jack 1 includes a vertically extending isolation bar 1600 which engages the notch 1500 on the plug 500 of FIG. 24 in order to prevent light being received or transmitted on one fiber optic cable from impinging upon the other fiber optic cable.

The manner in which a fiber optic cable can be terminated in the plug 500 will now be described with reference to FIGS. 22a, and 22b. A fiber optic cable 900 of the type having a pair of shielded plastic optical fibers 800, 810 can be terminated by removing a portion of the outer jacket 930 to expose the shielded fibers 910, 920 and stripping the jacket 940 from each optical fiber 910, 920 for a small part of the fiber length, slightly longer than the small-diameter portion 595 of the fiber bore 511. Each optical fiber is inserted into one of the fiber bores 511 in the plug body, so that the unjacketed fiber 910, 920 protrudes out of the front end 595 of each fiber bore 511. The fibers 910, 920 are cut flush with the face 541 of the protrusion 543, with, for example, a razor-like blade. Preferably, a connecting tool is provided which has a socket for receiving the plug body and which is arranged to move the blade across the front end of the plug body when the plug body is received in the socket of the tool. The connecting tool also forces each of the strain relief elements downwardly, breaking the strain relief element from the remainder of the body at the breakaway point 573 and pivoting the strain relief element downwardly around the hinge point 571, so that the strain relief element engages the outer jacket of the cable or the jacket of the individual fiber. At this point, the terminated fiber optic cable is ready for use.

To connect the cable with the jack 1, the plug 500 is inserted into the receptacle 120 of the jack 1 as shown in FIG. 7. The grooves 510 in the plug 500 engage the ribs 122 of the jack 1 and precisely position the plug 500 in the receptacle. The annular protrusions 543 on the front face of the plug 500 enter the openings 135 of the bores 133, so that each fiber 910, 920 held by the plug 500 is precisely aligned with one of the openings 135 of the jack. Thus, each fiber is in optical communication with the LED or receiving photo diode of the jack. The resilient latch 310 on the plug 500 engages a corresponding extension 125 of the receptacle 120. The protrusions 502, 503 on the side of the plug body engage in slots 504 (one shown in FIG. 9) in the sidewalls of the receptacle 120. When the plug is inserted into the receptacle, the guide channels 505, 506 engage and guide the contacts 110. Both contacts 110 engage the shorting bar 540 on the plug 500, thereby connecting terminal pin 70.2 (TX+) to the input terminal of the LED 210 (illustrated in FIG. 30 as closing the symbolic switch 580) and enabling operation of the LED 210.

In this manner the fiber optic cable is connected to a data communications device. Optical signals appearing on the optical fiber aligned with the receiving photo diode are converted into electrical signals by the photo diode 200, amplified by the amplifier 610, and transmitted to the magnetics converter or driver circuit 700 as a signal across RX+ terminal pin 70.3 and RX− terminal pin 70.4. The received signal is then further conditioned by the data quantizer of the magnetics converter 700 to provide a signal with conventional digital logic values (e.g. ECL logic values, TTL logic values). From the magnetics converter, the signal is passed through to the circuitry of the data communications device for processing in a conventional manner. Signals to be transmitted signal from the data communications device are applied to the LED driver of the magnetics converter 700, then passed through to the opto-electric conversion circuit 600 at the TX+ and TX− terminal pins 70.2, 70.1, converted to optical signals by the LED 210 and then transmitted through the optical fiber aligned with the LED 210.

A plug in accordance with an alternate embodiment of the invention is shown in FIGS. 18–21, with similar components bearing identical reference numerals to FIGS. 1–9, and 22. This plug is similar to the plug of FIGS. 10–14, except that the plug of FIGS. 18–21 includes an electrical wire bore 1010 extending forward longitudinally from the pocket 570, in between the fiber bores 511. The electrical wire bore 1010 extends almost to the front end 520 of the plug, but is not open onto the front end 520. In place of the shorting bar 540 of FIGS. 10–14, the plug of FIGS. 18–21 includes a pair of insulation displacing contacts 1012. In addition, the plug body 501 includes a pair of IDC channels 1020 extending downwardly from the top surface 522 and communicating with the electrical wire bore 1010 adjacent the front end thereof. In the condition shown in FIG. 20, the insulation displacing contacts 1012 are in a raised position in the IDC channels 1020 and are disposed in alignment with the guide channels 505, 506. Once an insulated electrical wire is inserted into each respective electrical wire bore 1010, the corresponding insulation displacing contact 1012 is moved downward to displace the insulation surrounding its respective electrical wire, and to form an electrical connection between the insulation displacing contact 1012 and the electrical wire. The configuration of the insulation displacing contacts 1012, guide channels 505, 506, and IDC channels 1020 may be identical to those used in a standard RJ plug. The plug 500 of FIGS. 18–21 also has an electric wire strain relief element 1022. The plug 500 of FIGS. 18–21 is used with a cable having both jacketed optical fibers and jacketed electrical conductors. In use, the outer jacket of the cable is removed and the optical fibers are stripped as discussed above, and inserted into the fiber bores so that the end of the fibers protrude form the front of the plug as discussed above. Then, the jacketed electrical conductors are inserted into the electrical wire bores. The optical fibers are then cut flush with the face 542 of the protrusion 543, while, at the same time, the insulation displacing contacts are forced downwardly so that they pierce the insulation on the electric wires and make electrical contact with the wires. The electric wire strain relief element 1022 is then pressed down into engagement with the insulating jacket on the wires, thus locking the electrical wires in place. The other strain relief element (571–574) locks the optical fibers in place in the manner described above. It is contemplated that a tool will be configured to hold the plug 500, and perform the above-referenced operation.

The jack 1 to be used with the plug of FIGS. 18–21 is identical to the jack 1 discussed above, except that the contacts 110 are not connected to the TX+ terminal pin 70.2 of the jack 1. Instead, each respective contact 110 is connected directly to another one of the terminal pins (e.g. 74.5 thru 74.8). When the plug of FIGS. 18–21 is inserted into the receptacle of the jack 1, the optical fibers are placed in optical communication with the corresponding elements of the jack 1 as discussed above, and each of the contacts 110 engage respective ones of the insulation displacing contacts, thus making electrical contact with a corresponding electrical wire in the cable. In this manner, the electrical wires of the cable are electrically connected to appropriate traces on the circuit board of the data communications device through respective terminal pins of the jack 1.

In the embodiment of FIGS. 18–21, the LED 210 remains continuously enabled. In a further embodiment shown in FIGS. 14–17, both the shorting bar 540 of the embodiment of FIGS. 1–8 and the insulation displacing contacts 1012 as used in the embodiment of FIGS. 18–21 are provided. In accordance with this embodiment, the jack 1 includes four contacts 110, two of which engage the shorting bar 540, and two of which engage respective insulation displacing contacts 1020.

While the above-referenced embodiments are preferred because they provide a particularly effective, economical, and reliable design, a variety of mechanisms may be provided for disabling the LED 210 when the plug is removed from the jack 1. For example, a sensing element could be movably mounted in the receptacle and coupled to a pair of switching contacts in the jack, and the sensing element could be biased so that in a rest position, with no plug in the receptacle, the switch is open. Once a plug is inserted into the receptacle 120, the sensing element moves, the switch is closed, and the LED is enabled. In one preferred arrangement, the contacts 110 shown in FIG. 1 are modified so that a first one of the contacts 110 is engaged by the plug and forced into mechanical engagement with the a second one of the contacts 110. In this arrangement, the first contact is resiliently mounted in the receptacle like a conventional RJ-type jack contact, and is therefore biased to form an open circuit when no plug 500 is present in the jack. In addition, the shorting bar 540 as discussed above, may be replaced by a metallic element integral with the plug body. For example, the plug body itself could be wholly or partly metallic, and can engage sensing contacts in the same manner as the shorting bar. In still further embodiments, the normally open plug-closed arrangement provided by the shorting bar can be reversed, so that a switch in the jack connected in parallel with the LED is normally closed, thereby disabling the LED, and the switch is opened when a plug is inserted, thereby enabling the LED. Moreover, the LED could be disabled from the magnetics converter circuit 700 by disabling the LED (via the TX+,TX−lines) when no signal is being received on RX+, RX−. Finally, the LED disabling function, and the electric transmission wire connecting functions can be omitted entirely. While the above-referenced embodiments have been described with reference to an RJ45 footprint, it should be clear that the invention is equally applicable to other RJ-type connectors including, for example, RJ11 and RJ38 connectors and plugs.

Figure 32:
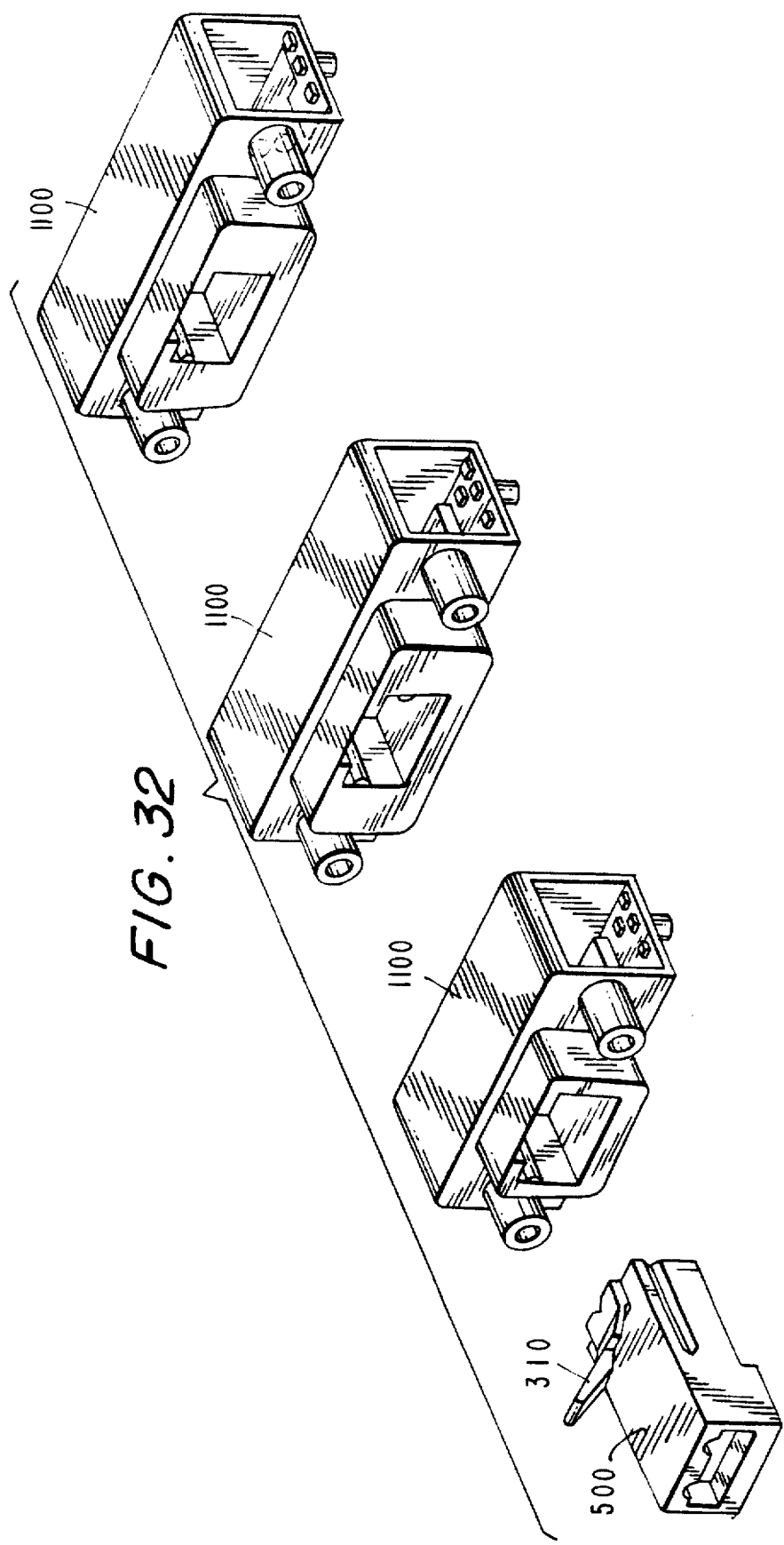
FIG. 32 shows a opto-electric D-subminiature jack in accordance with the present invention.
Figure 33:
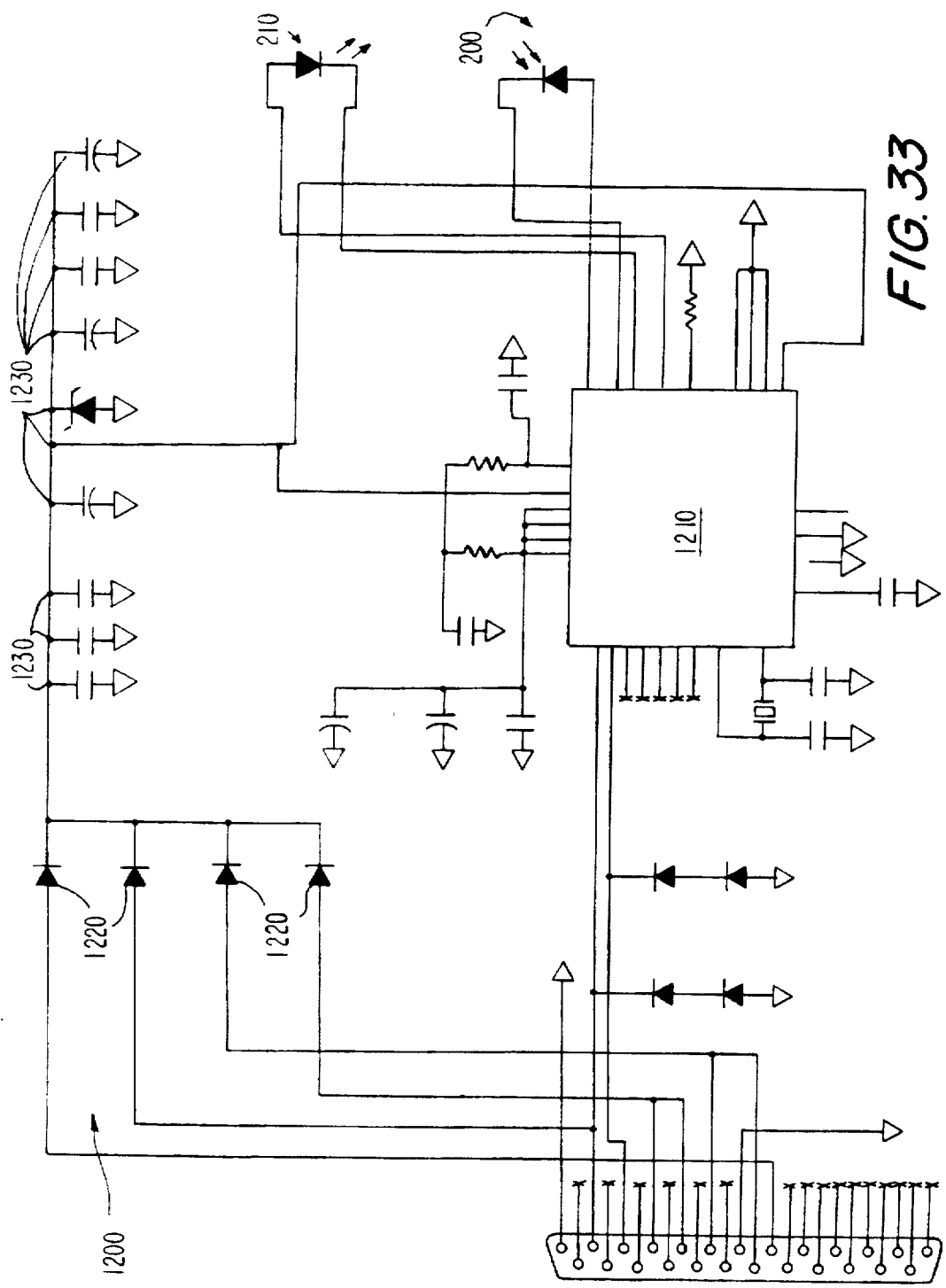
FIG. 33 shows a preferred embodiment of an opto-electric conversion circuit for the opto-electric D-subminiature jack of FIG. 32.
Figure 34:
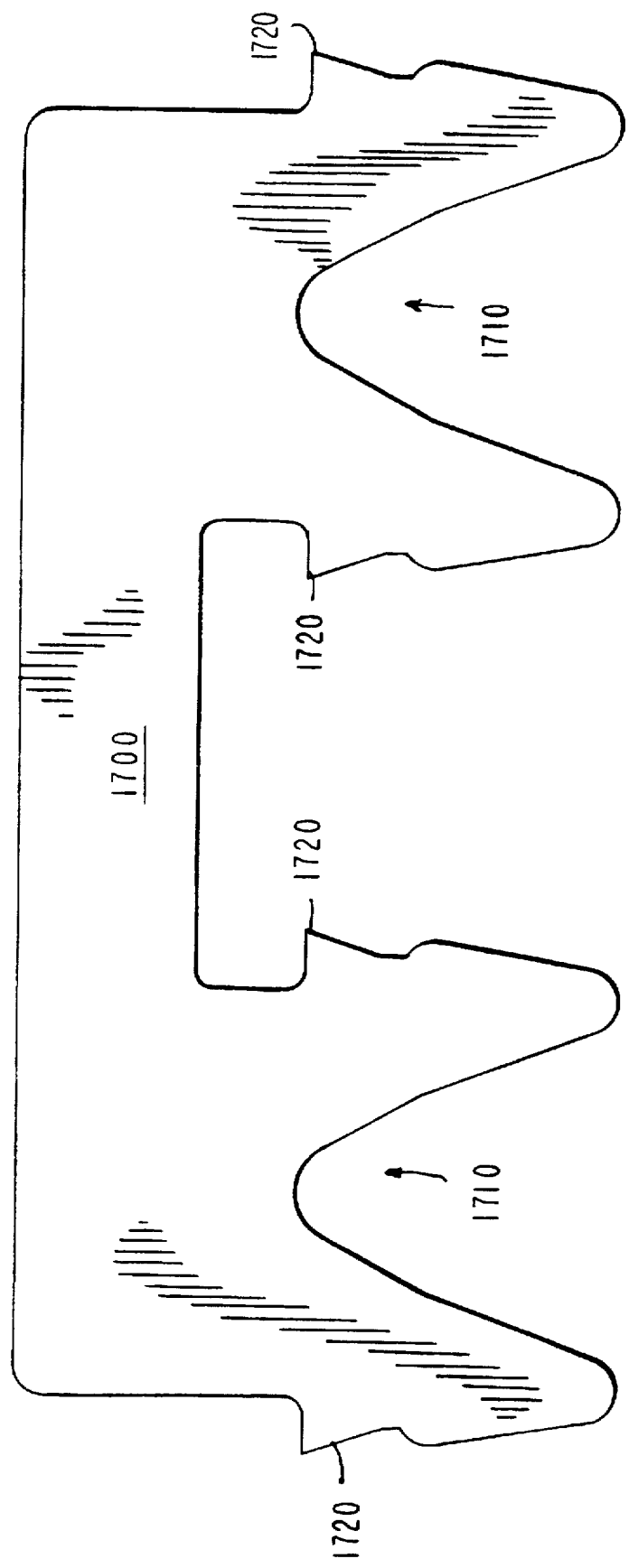
FIG. 34 shows an insulation displacing member in accordance with a further embodiment of the invention.
Figure 35:
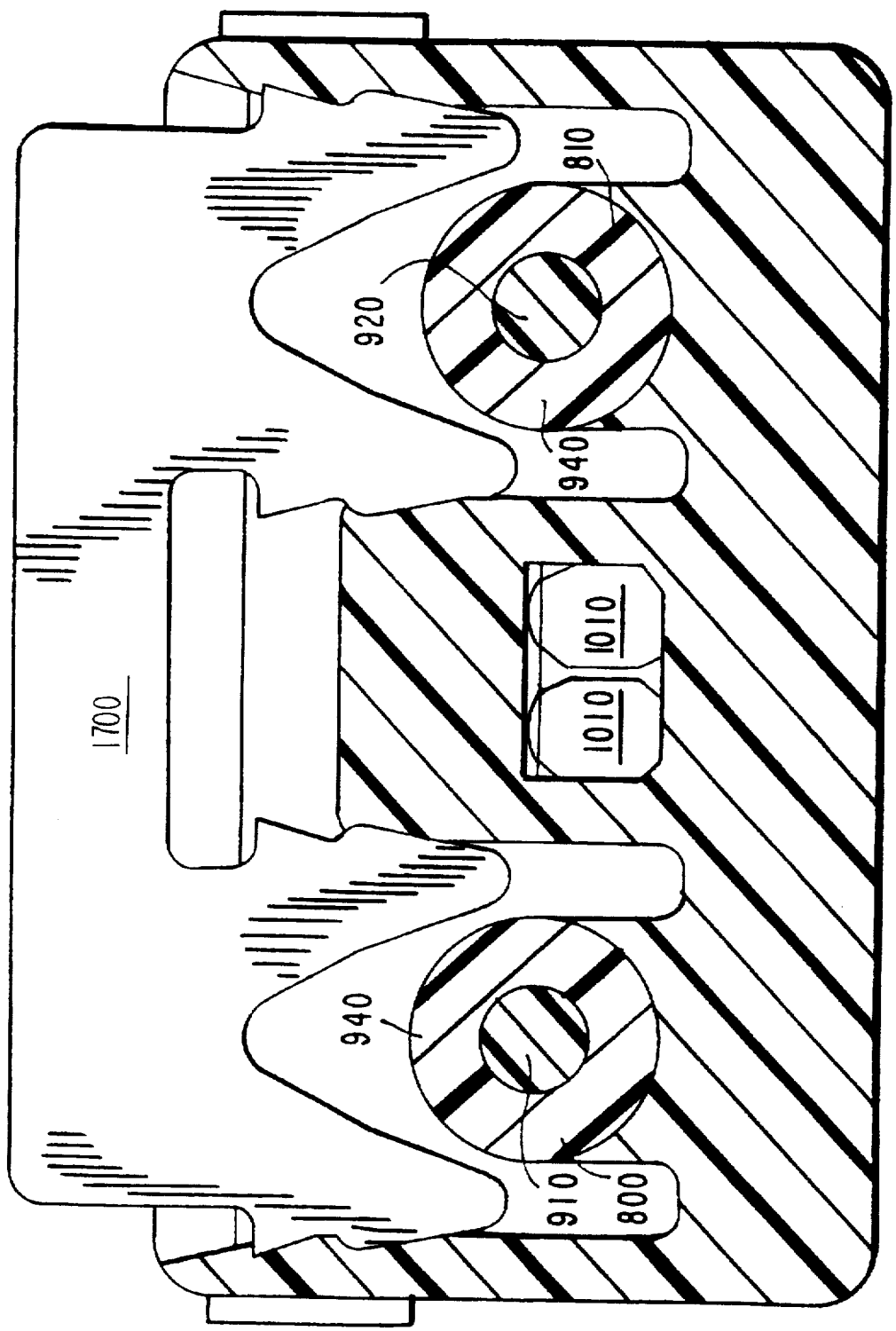
FIG. 35 shows the insulation displacing member of FIG. 34 partially inserted into an optical plug.

Moreover, in further embodiments of the invention, the jack may be arranged to mount in a mounting on the circuit board commonly used for a different type of connector, such as a D-subminiature connector as shown in FIG. 32. The outer shell of such a jack desirably has a physical size no larger than the physical size of the D-subminiature connector which it places. Such a housing typically is larger than the housing of an RJ jack. In this arrangement, the receptacle incorporated in the jack, and the corresponding plug, may have different configurations than those discussed above. However, it is preferred to use the same configurations as those discussed above so that the plugs 500 will be compatible with all optical jacks in the system. FIG. 32 shows an optical plug 500, and three D-subminiature optical jacks 1100 of varying sizes. Each jack 1100 has a size and footprint which corresponds to the size and footprint of a standard D-subminiature jack which it is designed to replace. In this manner, the D-subminiature optical jack 1100 serves as a drop in replacement for a standard electrical D-subminiature jack. Each jack 1100 has an opto-electric conversion and conditioning circuit 1200 incorporated therein. An illustrative circuit 1200 is shown in FIG. 33. The circuit 1200 includes an LED 210 and a receiving photo diode 200 which are mounted within the jack 1100 to provide an optical connection to the plug 500 in the same manner as described above with regard to FIGS. 1–30. The circuit 1200 further includes a signal conditioning chip 1210, such as the ACS 104 Optical Modem manufactured by Acapella, and rectifying diodes 1220 connected to the terminal pins 1400. As one of ordinary skill in the art will appreciate, if the potential across a diode is less than a threshold value (for example, +0.7 volts), the diode will approximate an open circuit, and if the potential across the diode is greater than the threshold value, the diode approximate a short circuit. Therefore, the capacitors 1230 are charged by positive signals which appear on the input terminal (left side) of the diodes 1220. The capacitors 1230 store power received through the diodes 1220, and supply power to the appropriate connections of the signal conditioning chip 1210. The capacitors 1230 also supply power for operation of the LED 210. The electrical connections or "pinout" of the circuit are shown with reference to a symbolic D-sub pinout. However, there is no D-subminiature connector in the system. The jack 1100 replaces the D-subminiature connector. The jack has terminal pins 1400 (partially shown) in locations corresponding to the terminal pin locations of a corresponding D-subminiature connector. The symbolic D-sub pinout in FIG. 10 identifies which terminal pin of the jack corresponds to which terminal pin of the conventional D-subminiature connector.

Figure 36:
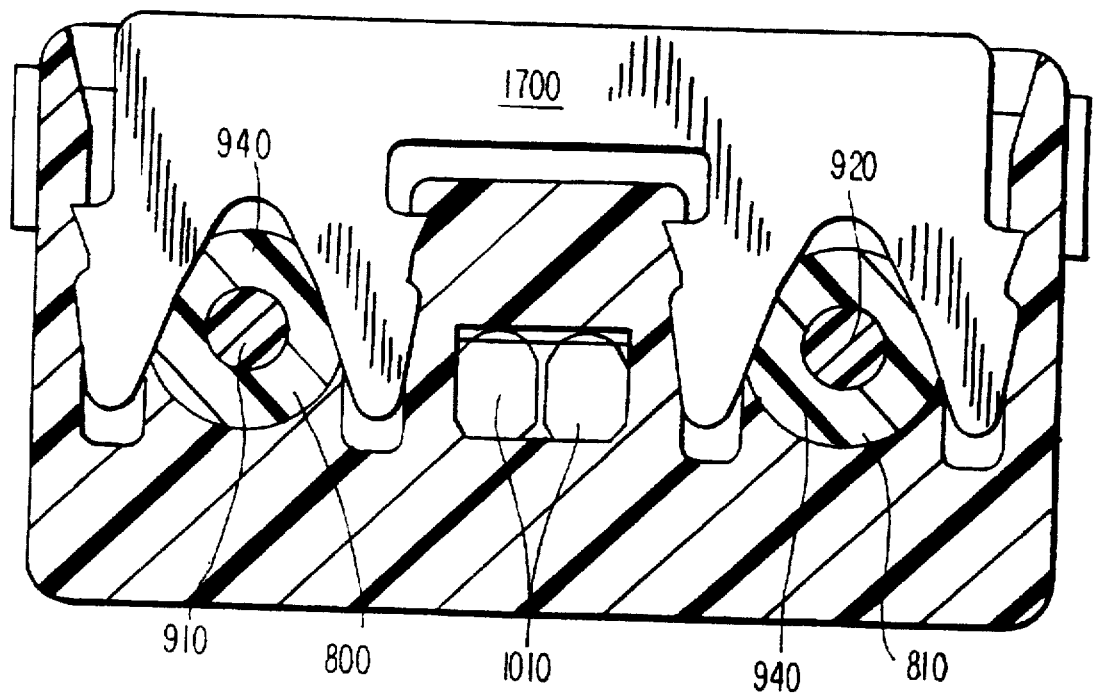
FIG. 36 shows the insulation displacing member of FIG. 34 fully inserted into an optical plug.
Figure 37:
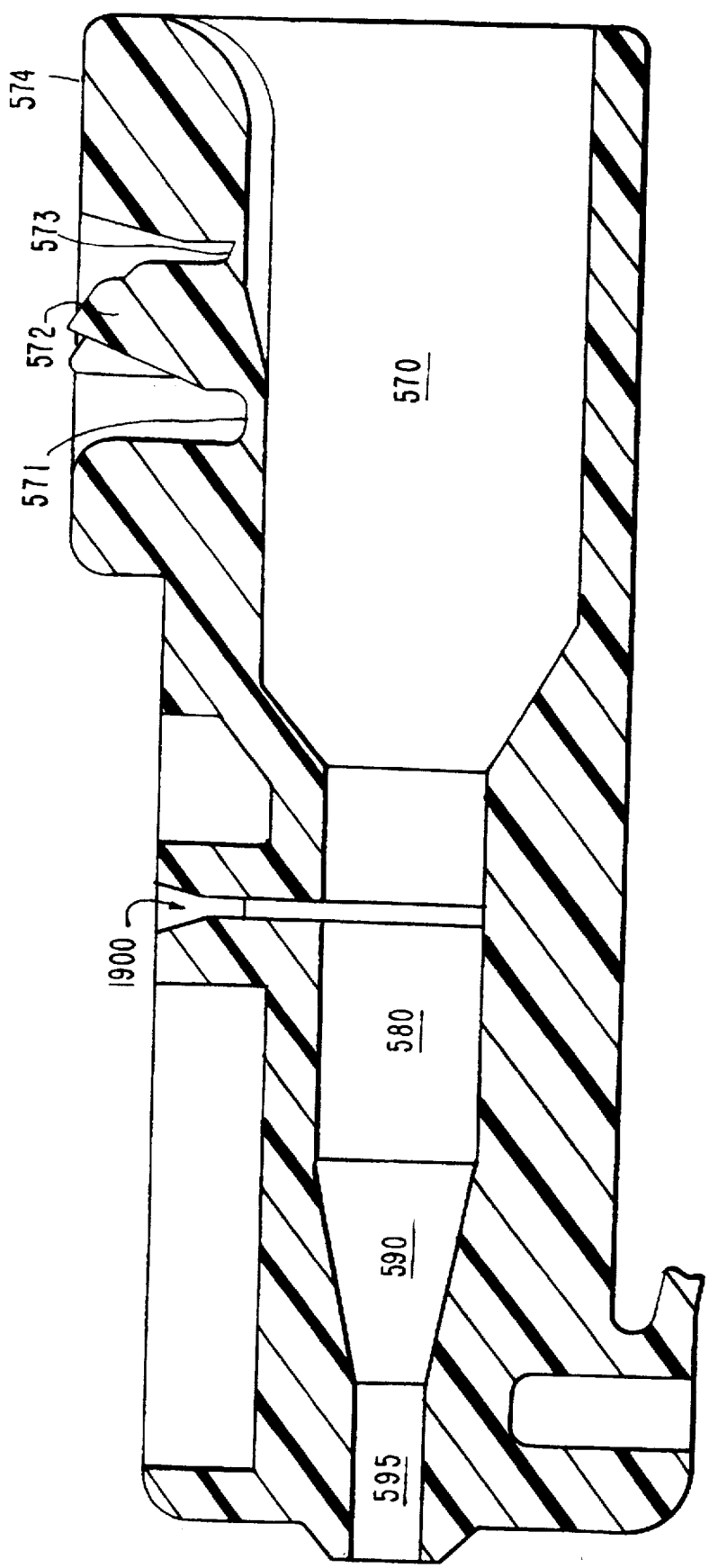
FIG. 37 shows a plug for use with the insulation displacing member of FIGS. 34–36.

FIGS. 34–37 show an alternative strain relief element for the jacketed optical fibers 800, 810, with similar components bearing the same reference numerals as FIGS. 1–33. The plug 500 is of the same general construction as FIGS. 18–22. However, an insulation displacing member (IDM) 1700 is provided within an IDM channel 1900. The IDM 1700 includes a pair of displacing elements 1710, and four securing elements 1720. Referring to FIG. 36, the IDM 1700 is shown in its pre-inserted position in the IDM channel 1900. Once the optical fibers 800, 810 have been inserted into the plug as described above and shown in FIG. 36, the IDM 1700 is pressed downwardly within the IDM channel 1900, and the displacing elements 1710 pierce the insulation 940 but do not contact the fibers 910, 920. In addition, as the IDM 1700 is pressed downwardly, the securing elements 1720 become securely embedded in the walls of the IDM channel 1900. In this manner, the IDM 1700 secures the optical cables 800, 810 in the plug 500. With this construction, when electrical conductors and optical fibers are provided in a single cable, the outer cable jacket 930 can enter the pocket 570, and the strain relief elements 571–574 can be used to engage both the optical cables and the electrical conductors, because the optical cables have been independently secured forward of the pocket 570 by the IDM 1700, and the electrical conductors have been independently secured forward of the pocket by the IDC 1012.

With the construction of FIGS. 34–37, moreover, the electric wire strain relief element 1022 can be omitted because of the strain relief provided by the strain relief elements 571–574. In contrast, in the embodiment of FIGS. 18–21, the outer cable jacket does not enter the pocket 570. Rather, as more clearly shown in FIG. 21, the outer cable jacket 930 is stripped beyond the pocket 570, and the strain relief elements 571–574 only engage the individual optical cables 800, 810, and not the outer cable jacket 930 with the optical cables and electrical conductors disposed therein.

The invention has been described above primarily with regard to drop-in replacements for RJ and D-subminiature type connectors. It should be noted however, that while significant advantages are provided by providing a drop-in replacement for electrical connectors as described above, in accordance with other embodiments of the invention, the connector need not be configured as a drop-in replacement. In this regard, in applications in which the opto-electric jack is being installed on new equipment, it may not be necessary to provide a terminal pin array which is identical to an RJ or D-subminiature type connector, or to ensure that the external dimensions of the jack do not exceed the external dimensions of a conventional RJ or D-subminiature type connector. Nevertheless, such an embodiment would still provide the advantage of providing an optical connector with internal opto-electric conversion elements which uses the familiar mechanical nomenclature of an RJ or D-subminiature type modular jack and plug.

What is claimed is:

1. An optical cable jack for use with an electronic data communications device of the type having a circuit board and a mounting on said board having a predetermined configuration and adapted to hold an electrical data cable connector connecting the electrical cable connector to the board, said optical cable jack comprising:

(a) a housing;
   (b) an electrical circuit in said housing including at least one optoelectronic conversion device mounted in said housing,
   (c) a receptacle in said housing for engaging a plug on a fiber optic cable and maintaining at least one fiber of such fiber optic cable in optical communication with said at least one optoelectronic conversion device;
   (d) a plurality of mounting contacts on said housing connected to said electrical circuit and arranged in said predetermined configuration, whereby the optical cable jack can be mounted on a circuit board in place of an electrical cable connector to configure the data communications device for connection to a fiber optic data cable.

2. An optical cable jack as claimed in claim 1 for replacing a 9-pin D-sub electrical data cable connector, said predetermined configuration of said mounting contacts on the optical cable jack being the same as the configuration of board mounting contacts on a 9-pin D-sub electrical data cable connector.

3. An optical cable jack as claimed in claim 1 for replacing a 15-pin D-sub electrical data cable connector, said predetermined configuration of said mounting contacts on the optical cable jack being the same as the configuration of board mounting contacts on a 15-pin D-sub electrical data cable connector.

4. An optical cable jack as claimed in claim 1 for replacing a 25-pin D-sub electrical data cable connector, said predetermined configuration of said mounting contacts on the optical cable jack being the same as the configuration of board mounting contacts on a 25-pin D-sub electrical data cable connector.

5. An optical cable jack as claimed in claim 1 for replacing an RJ-45 telephone cable connector, said predetermined configuration of said mounting contacts on the optical cable jack being the same as the configuration of board mounting contacts on a RJ-45 telephone cable connector.

6. An optical cable jack as claimed in claim 1 further comprising a power storage element mounted in said housing, means for capturing power from electrical data signals transmitted through the jack, said circuit in said housing being powered by said power storage element.

7. An optical cable jack as claimed in claim 6 wherein said circuit further includes a signal conditioning element for modifying electrical data signals sent to or from said optoelectronic element, said signal conditioning element being powered by said power storage element.

8. An optical cable jack for use with an electronic data communications device of the type having a circuit board and a mounting on said board having a mounting for an RJ type telephone cable jack, said optical cable jack comprising:

(a) a housing;

(b) an electrical circuit in said housing including at least one optoelectronic conversion device mounted in said housing;

(c) a receptacle in said housing for engaging a plug on a fiber optic cable and maintaining at least one fiber of such fiber optic cable in optical communication with said at least one optoelectronic conversion device;

(d) a plurality of terminal contacts on said housing connected to said internal electrical circuit and arranged in a terminal contact configuration corresponding to the terminal contact configuration of an RJ type telephone cable jack, whereby the optical cable jack can be mounted on a circuit board in place of an RJ type telephone cable connector to configure the data communications device for connection to a fiber optic data cable.

9. A jack as claimed in claim 8 wherein said housing includes a bottom surface and said terminal contacts are disposed on said bottom surface.

10. A jack as claimed in claim 9 wherein said terminal contacts include terminal pins projecting downwardly from said bottom surface.

11. A jack as claimed in claim 10 wherein said terminal pins are disposed at locations of an array, the array including front and rear rows of locations extending in a widthwise direction across said bottom surface, the rows being spaced apart from one another in a lengthwise direction by about 2.54 mm, the locations in each row being separated form one another by about 2.54 mm, the locations of the rear row being offset from the locations of the front row by about 1.27 mm.

12. A jack as claimed in claim 10 further comprising an electrically conductive shield at least partially surrounding and encompassing said housing, said shield including shield pins projecting downwardly from said bottom surface of said housing.

13. A jack as claimed in claim 10 comprising a pair of securement posts fixed to said housing and projecting downwardly form said bottom surface thereof.

14. A jack as claimed in claim 8 wherein said housing is configured to fit within a space no larger than 22 mm long, 23 mm wide and 21 mm high.

15. A jack as claimed in claim 8 wherein said at least one optoelectronic conversion device in said electrical circuit includes a light emitting device and a receiving photoelectric device, said electrical circuit further including an amplifier connected to said receiving photoelectric device.

16. A jack as claimed in claim 15 wherein said terminal contacts include a pair of transmit signal contacts connected across said light emitting diode, and a pair of receive signal contacts, said amplifier having signal input connections connected to said receiving photoelectric device, a signal output connection connected to a first one of said received signal contacts, a local ground connection connected to a second one or said received signal contacts, and a power supply supply connection connected to one of said transmit signal contacts, whereby said amplifier may be supplied with power by applying a DC potential between said one of said transmit signal contacts and said second one of said received signal contacts.

17. A jack as claimed in claim 16 further comprising a principal ground and a local ground, said local ground being connected to said principal ground through an inductor in said circuit so that said DC potential can be applied by applying a DC potential between said one of said transmit signal contacts and said principal ground.

18. A jack as claimed in claim 17 further comprising an electrically conductive shield at least partially surrounding and encompassing said housing, said shield defining said principal ground.

19. A jack as claimed in claim 16 further comprising an inductor coupled between the power supply connection and said one of said transmit signal contacts for attenuating transmission of AC signal components from said transmit signal contacts to said power connection of said amplifier.

20. A jack as claimed in claim 1 further comprising means for disabling at least one said optoelectronic conversion device when no plug is received in said receptacle.

21. A jack as claimed in claim 20 wherein said at least one optoelectronic conversion device in said electrical circuit includes a light emitting device, said disabling means being operative to disable said light emitting device when no plug is received in said receptacle.

22. A jack as claimed in claim 21 wherein said means for disabling said light emitting device includes a pair of sensing contacts mounted in said housing and protruding into said receptacle, said contacts being adapted to engage a plug when a plug is received in the receptacle so that the sensing contacts will be connected to one another through the plug only when a plug is received in the receptacle.

23. A jack as claimed in claim 22 wherein said sensing contacts are connected in series with said light emitting device.

24. A jack as claimed in claim 21 wherein said means for disabling includes a sensing element mounted to the housing for movement between a rest position in which the sensing element protrudes into said receptacle and a displaced position said means for disabling further including a resilient element for biasing said sensing element to said rest position, and a pair of sensing contacts, at least one of said sensing contacts being linked to said sensing element so that said sensing contacts will be opened or closed upon movement of said sensing element between said positions.

25. A jack as claimed in claim 24 wherein said sensing element, resilient element and one of said sensing contacts are formed as a single integral element.

26. A jack as claimed in claim 1 further comprising electrical transmission contacts mounted to said housing and extending into said receptacle, said electrical transmission contacts being adapted to engage electrical contacts on a plug for said fiber optic cable, said electrical transmission contacts being connected to some of said mounting contacts, whereby said jack can make an electrical connection as well as an optical connection to the cable.

27. A jack as claimed in claim 26 wherein said electrical transmission contacts have configuration and spacing corresponding to the configuration and spacing of electrical transmission contacts in an RJ type telephone cable jack.

28. An optical cable jack for use with an electronic data communications device, said optical cable jack comprising:
   (a) a housing;
   (b) an electrical circuit in said housing including at least one optoelectronic conversion device mounted in said housing;
   (c) a receptacle in said housing for engaging a plug on a fiber optic cable and maintaining at least one fiber of such fiber optic cable in optical communication with said at least one optoelectronic conversion device;
   (d) terminal contacts on said housing connected to said electrical circuit, whereby the optical cable jack can be connected to the data communications device; and
   (e) means for disabling at least one said optoelectronic conversion device when no plug is received in said receptacle.

29. A jack as claimed in claim 28 wherein said at least one optoelectronic conversion device in said electrical circuit includes a light emitting device, said disabling means being operative to disable said light emitting device when no plug is received in said receptacle.

30. A jack as claimed in claim 29 wherein said means for disabling said light emitting device includes a pair of sensing contacts mounted in said housing and protruding into said receptacle, said contacts being adapted to engage a plug when a plug is received in the receptacle so that the sensing contacts will be connected to one another through the plug only when a plug is received in the receptacle.

31. A jack as claimed in claim 30 wherein said sensing contacts are connected in series with said light emitting device.

32. A jack as claimed in claim 29 wherein said means for disabling includes a sensing element mounted to the housing for movement between a rest position in which the sensing element protrudes into said receptacle and a displaced position said means for disabling further including a resilient element for biasing said sensing element to said rest position, and a pair of sensing contacts, at least one of said sensing contacts being linked to said sensing element so that said sensing contacts will be opened or closed upon movement of said sensing element between said positions.

33. A jack as claimed in claim 32 wherein said sensing element, resilient element and one of said sensing contacts are formed as a single integral element.

34. An optical cable jack for use with an electronic data communications device, said optical cable jack comprising:
   (a) a housing;
   (b) an electrical circuit in said housing including at least one optoelectronic conversion device mounted in said housing;
   (c) a receptacle in said housing for engaging a plug on a fiber optic cable and maintaining at least one fiber of such fiber optic cable in optical communication with said at least one optoelectronic conversion device;
   (d) terminal contacts on said housing connected to said electrical circuit, whereby the optical cable jack can be connected to the data communications device; and
   (e) electrical transmission contacts mounted to said housing and extending into said receptacle, said electrical transmission contacts being adapted to engage electrical contacts on a plug for said fiber optic cable, said electrical transmission contacts being connected to some of said terminal contacts, whereby said jack can make an electrical connection as well as an optical connection to the cable.

35. A plug for terminating a fiber optic cable comprising a plug body having a front end and a back end and having an external configuration adapted to engage a receptacle in a jack with said forward end protruding into said receptacle, said plug body defining at least one fiber optic bore extending between said forward and rearward ends so that at least one optical fiber can be positioned in the bore with an end of the fiber adjacent the front end of the body and with the fiber projecting from the back end of the body, the plug having an electrically conductive shorting element on the body.

36. A plug as claimed in claim 35 wherein the body is formed from a dielectric material and the shorting element includes a metallic element disposed on the body adjacent the forward end thereof.

37. A plug as claimed in claim 36 wherein the body is generally in the form of a rectangular solid and has right, left, top and bottom sides extending in the front-to-body directions, a and wherein the shorting element is exposed on the top side of the body.

38. A plug as claimed in claim 37 wherein the body has at least two guide slots at the top adjacent the forward edge for engaging and guiding contacts on the jack into engagement with the shorting element.

39. A plug for terminating a fiber optic cable comprising a plug body formed from a dielectric material, the plug body having a front end and a back end and having an external configuration adapted to engage a receptacle in a jack with said forward end protruding into said receptacle, said plug body defining at least one fiber optic bore extending between said forward and rearward ends so that at least one optical fiber can be positioned in the bore with an end of the fiber adjacent the front end of the body and with the fiber projecting from the back end of the body, said plug body further having at least one electrical wire bore extending into the body from the back end and one or more electrical contacts mounted on the body for engaging conductors of an electrical wire received in the electrical wire bore, said electrical contacts being exposed to the exterior of the plug body for engagement with contacts of the jack.

40. A plug as claimed in claim 39 wherein said contacts include at least two insulation displacing contacts disposed adjacent the forward end of the body and exposed to the top side of the body, the body further having guide slots at the top adjacent the forward edge of engaging and guiding contacts on the jack into engagement with the insulation displacing contacts of the plug.

41. A plug as claimed in claim 38 wherein the plug body is substantially of the size and shape of an RJ type telephone plug, and wherein the guide slots are at spacings corresponding to the spacings of the guide slots on an RJ type telephone plug.

42. A plug for terminating a fiber optic cable comprising a plug body having a front end and a back end and having an external configuration corresponding to the configuration of an RJ type telephone plug, said plug body being adapted to engage a receptacle in a jack with said forward end protruding into said receptacle, said plug body defining at least one fiber optic bore extending between said forward and rearward ends so that at least one optical fiber can be positioned in the bore with an end of the fiber adjacent the front end of the body and with the fiber projecting from the back end of the body.

43. A plug as claimed in claim 40 wherein the plug body is substantially of the size and shape of an RJ type telephone plug, and wherein the guide slots are at spacings corresponding to the spacings of the guide slots on an RJ type telephone plug.

44. A jack as claimed in claim 8 further comprising electrical transmission contacts mounted to said housing and extending into said receptacle, said electrical transmission contacts being adapted to engage electrical contacts on a plug for said fiber optic cable, said electrical transmission contacts being connected to some of said mounting contacts, whereby said jack can make an electrical connection as well as an optical connection to the cable.

45. The jack according to claim 1, wherein the plurality of mounting contacts include terminal contacts and securement posts.

46. A jack as claimed in claim 8 further comprising means for disabling at least one said optoelectronic conversion device when no plug is received in said receptacle.

* * * * *